(12) United States Patent
Pack et al.

(10) Patent No.: US 9,104,202 B2
(45) Date of Patent: Aug. 11, 2015

(54) REMOTE VEHICLE MISSIONS AND SYSTEMS FOR SUPPORTING REMOTE VEHICLE MISSIONS

(75) Inventors: Robert Todd Pack, Hollis, NH (US); Daniel P. Allis, Lynn, MA (US); Marshall J. Vale, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 428 days.

(21) Appl. No.: 13/215,846

(22) Filed: Aug. 23, 2011

(65) Prior Publication Data

US 2012/0095619 A1    Apr. 19, 2012

Related U.S. Application Data

(63) Continuation-in-part of application No. 13/105,883, filed on May 11, 2011, now Pat. No. 9,002,535.

(60) Provisional application No. 61/376,249, filed on Aug. 23, 2010, provisional application No. 61/333,734, filed on May 11, 2010.

(51) Int. Cl.
*G05D 1/00* (2006.01)
*G05D 1/02* (2006.01)

(52) U.S. Cl.
CPC ............ *G05D 1/0038* (2013.01); *G05D 1/0088* (2013.01); *G05D 1/0274* (2013.01); *G05D 1/027* (2013.01); *G05D 1/0242* (2013.01); *G05D 1/0246* (2013.01); *G05D 1/0272* (2013.01); *G05D 1/0278* (2013.01); *G05D 2201/0207* (2013.01); *G05D 2201/0209* (2013.01)

(58) Field of Classification Search
CPC ................. G05D 2201/0207; G05D 1/0274
USPC ................................ 701/2; 398/106; 700/245
See application file for complete search history.

(56) References Cited

U.S. PATENT DOCUMENTS

| 7,720,552 | B1 * | 5/2010 | Lloyd | ............................. 700/10 |
| 2001/0037163 | A1 * | 11/2001 | Allard | ........................... 700/245 |

(Continued)

OTHER PUBLICATIONS

International Search Report of International Publication No. WO 2012/027390 A2 (International Application No. PCT/US2011/048838), dated Apr. 13, 2012.

(Continued)

*Primary Examiner* — Redhwan K Mawari
*Assistant Examiner* — Rodney P King
(74) *Attorney, Agent, or Firm* — Honigman Miller Schwartz and Cohn LLP

(57) ABSTRACT

An operator control unit having a user interface that allows a user to control a remote vehicle, the operator control unit comprising: a transmission unit configured to transmit data to the remote vehicle; a receiver unit configured to receive data from the remote vehicle, the data received from the remote vehicle comprising image data captured by the remote vehicle; and a display unit configured to display a user interface comprising the image data received from the remote vehicle and icons representing a plurality of controllable elements of the remote vehicle, and configured to allow the user to input a control command to control at least one of the plurality of controllable elements. Inputting a control command to control the at least one controllable element comprises selecting the icon representing the at least one controllable element, inputting an action for the at least one controllable element, and requesting that the at least one controllable element performs the action.

8 Claims, 18 Drawing Sheets

(56) References Cited

U.S. PATENT DOCUMENTS

| | | |
|---|---|---|
| 2006/0079997 A1 | 4/2006 | McLurkin et al. |
| 2008/0086236 A1 | 4/2008 | Saito et al. |
| 2008/0294288 A1 | 11/2008 | Yamauchi |
| 2009/0234499 A1 | 9/2009 | Nielsen et al. |
| 2009/0289591 A1 | 11/2009 | Kassow et al. |

OTHER PUBLICATIONS

Written Opinion of International Publication No. WO 2012/027390 A2 (International Application No. PCT/US2011/048838), dated Apr. 13, 2012.

Office Action for Australian Patent Application No. 2011293447, dated Nov. 4, 2013.

* cited by examiner

REMOTE VEHICLE MISSIONS AND SYSTEMS FOR SUPPORTING REMOTE VEHICLE MISSIONS

CROSS REFERENCE TO RELATED APPLICATIONS

This application is a continuation-in-part of U.S. patent application Ser. No. 13/105,883, filed May 11, 2011, titled Navigation Portals for a Remote Vehicle Control User Interface. This application claims priority to Provisional Patent Application No. 61/376,249, filed Aug. 23, 2010. The entire content of both applications listed above is incorporated herein by reference.

SUMMARY

The present teachings provide an operator control unit having a user interface that allows a user to control a remotely-located vehicle (referred to herein as a remote vehicle, and including, for example, a robot (e.g., an iRobot® unmanned ground vehicle) having a transmission unit configured to transmit data to the remote vehicle, a receiver unit to receive data from the vehicle, the data received from the remote vehicle comprising image data captured by the remote vehicle, and a display unit to display a user interface image comprising the image data captured by the remote vehicle and image data representing a plurality of controllable elements of the remote vehicle, and to allow the user to input a control command to control at least one controllable element of the plurality of controllable elements.

Inputting a control command to control the at least one controllable element comprises selecting the at least one controllable element from the user interface image, inputting an action for the at least one controllable element, and requesting that the at least one controllable element performs the action.

In an exemplary embodiment of the present teachings, the display unit includes a touch-screen display. Furthermore, selecting the at least one element comprises touching the touch-screen display at a location depicting the at least one element, and inputting the action comprises manipulating the image of the at least one controllable element on the touch-screen while touching the screen.

The present teachings also provide a method for utilizing a graphical user interface and a system infrastructure to perform a variety of missions, examples of which are set forth herein.

The present teachings further provide a remote vehicle that can be initialized and configured based on its available hardware and software, the remote vehicle and/or an associated operator control unit determining, based on the remote vehicle's configuration, which missions the remote vehicle can support. In certain embodiments, the system displays a list of supported missions to an operator and allows the operator to select a mission. In certain embodiments, a list of available remote vehicles that are running and controllable by an operator control unit can be listed for the operator (for example by being displayed on the operator control unit), along with missions each remote vehicle can perform based on its configuration, and the operator can select one or more desired remote vehicles and a mission for each selected remote vehicle. In certain embodiments, once a mission for a remote vehicle is selected, software and data necessary and/or desirable for supporting the mission can be loaded onto the remote vehicle.

The present teachings provide an operator control unit having a user interface that allows a user to control a remote vehicle, the operator control unit comprising: a transmission unit configured to transmit data to the remote vehicle; a receiver unit configured to receive data from the remote vehicle, the data received from the remote vehicle comprising image data captured by the remote vehicle; and a display unit configured to display a user interface comprising the image data received from the remote vehicle and icons representing a plurality of controllable elements of the remote vehicle, and configured to allow the user to input a control command to control at least one of the plurality of controllable elements. Inputting a control command to control the at least one controllable element comprises selecting the icon representing the at least one controllable element, inputting an action for the at least one controllable element, and requesting that the at least one controllable element performs the action.

The display unit comprises a touch-screen display and the icons each comprise an image of the controllable element that they represent. Selecting the at least one controllable element comprises touching the touch-screen display at or around the icon representing the at least one controllable element, and inputting the action comprises manipulating the image of the at least one controllable element on the touch-screen while touching the screen.

The display unit comprises a computer mouse. Selecting the at least one controllable element comprises clicking the mouse pointer at or around the icon representing the at least one controllable element, and inputting the action comprises manipulating the image of the at least one controllable element on the display while clicking the mouse.

The display unit comprises a computer joystick. Selecting the at least one controllable element comprises clicking the joystick at or around the icon representing the at least one controllable element, and inputting the action comprises manipulating the image of the at least one controllable element on the display while clicking the joystick.

The operator control unit comprises at least one stereo-vision camera to generate a 3D VOXEL-based representation of an area in which the vehicle is located. Data received from the vehicle further comprises stereo-vision-based data for generating the VOXEL-based representation. The image displayed by the display unit further comprises the VOXEL-based representation and a representation of the remote vehicle. The VOXEL-based representation and the representation of the remote vehicle depict the inputted action.

The user interface image comprises an action-selection button, and pressing the action-selection button directs the operator control unit to request the remote vehicle to perform the inputted action depicted by the VOXEL-based representation and the representation of the vehicle.

The operator control unit requests the vehicle to perform the action simultaneously to the depiction by the VOXEL-based representation and the representation of the vehicle.

After the vehicle performs the action depicted by the VOXEL-based representation and the representation of the vehicle, manipulation of any controllable element of the plurality of controllable elements updates the manipulation in at least one of the vehicle and the depiction by the VOXEL-based representation and the representation of the vehicle.

The present teachings also provide a method for conducting a remote vehicle mission. The method comprises selecting among teleoperation, waypoint-guided, and endpoint-guided piloting strategies for driving a remote vehicle around an area; initiating a mission consisting of at least one mission phase, a mission phase being a temporal, task grouping, or other mission subdivision having a beginning and an end or defined criteria, in which known rules of engagement, procedures, and preferred tactics are followed; creating and/or using a top-down coordinate map including one or more of coordinates, an occupancy map, a free space map, a connectivity success map, and a photographic map; marking the top-down coordinate map with identifiers capable of being selected and interpreted to recall photographs or video taken by the remote vehicle at the coordinates; following a tactical approach to a known suspicious object; recording and transmitting one or more of real-time or recorded video, real-time or recorded sensor data or telemetry, and real-time or recorded map data, to one or more of a local data storage, local IF repeater, and remote data storage; recording and receiving one or more of real-time or recorded video, real-time or recorded sensor data or telemetry, and real-time or recorded map data, from another remote vehicle or group of sensors, to one or more of a local data storage, local IF repeater, and remote data storage; using autonomous behaviors to perform exploring and mapping functions; using a set of sequenced behaviors to form an autonomous sequence; recording and receiving real-time or recorded connectivity information, to one or more of a local data storage, local IF repeater, and remote data storage, for a variety of frequency bands, to provide identification of areas of secure upload or data streaming for the remote vehicle to return to or proceed to in mission planning, retrotraverse, or sequence, connectivity information being transmitted from the same or a different remote vehicle or sensor group and/or from a local data storage, local IF repeater, or remote data storage; and marking the top-down coordinate map with identifiers capable of being selected and interpreted to recall CBRNE and/or sensor data or sweep mapping taken by the remote vehicle at or near coordinates.

Following a tactical approach to a known suspicious object comprises: identifying target coordinates of the known suspicious object on the top-down coordinate map and following a set of sequential or non-sequential state-machine steps from a present location to the target coordinates: and performing one or more of incremental advance, surveying and checking surroundings, slow advance, RF-silent advance, CBNRE scan at predetermined stand-off distance, circle and collect different directional views and return to stand-off, deposit ordnance or sensor package, and retreat.

Recording and receiving take place over low bandwidth and/or low frequency links that perform well in difficult environments.

Using autonomous behaviors to perform exploring and mapping functions comprises one or more of using behaviors that use machine vision techniques to identify landmarks and using an IMU to conduct exploration beyond radio range and return or retrotraverse to radio contact using one or more of landmarks and waypoint recordings of the IMU.

The set of sequenced behaviors comprises one or more stand-alone behaviors started or continued when a sensor condition is satisfied, and/or a sequence of behaviors that can be started or continued when either a sensor condition is satisfied or a preceding behavior succeeds and/or finishes.

The present teachings further provide a method for performing an EOD mission using a robotic system comprising an operator control unit with which an operator can interact and a remote vehicle having a robot head including a processor. The method comprises: transferring data needed to support the EOD mission from the operator control unit to the robot head processor; transferring data needed to support the EOD mission from the remote vehicle to the robot head processor; checking, with the operator control unit, for other available remote vehicles with which the operator control unit can communicate to share data and commands for the EOD mission; checking, with the robot head, for hardware on the remote vehicle to which it is attached and for other available remote vehicles with which it can communicate and share data; retrieving information regarding the other available remote vehicles; determining, from the retrieved information regarding the other available remote vehicles, which missions each of the other available remote vehicles can perform; informing the operator regarding available remote vehicles and supported missions; allowing the operator to select a remote vehicle and a mission via interaction with the operator control unit; loading a user interface configuration onto the operator control unit based on the operator control unit hardware, the remote vehicle hardware, and the selected EOD mission.

A state machine is available for the selected EOD mission, and the operator control unit retrieves any available historical maps and data available for and relevant to the selected EOD mission, and sends the historical data to the robot head for use in the mission.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and, together with the description, serve to explain the principles of the teachings.

DESCRIPTION OF EXEMPLARY EMBODIMENTS

Figure 1:
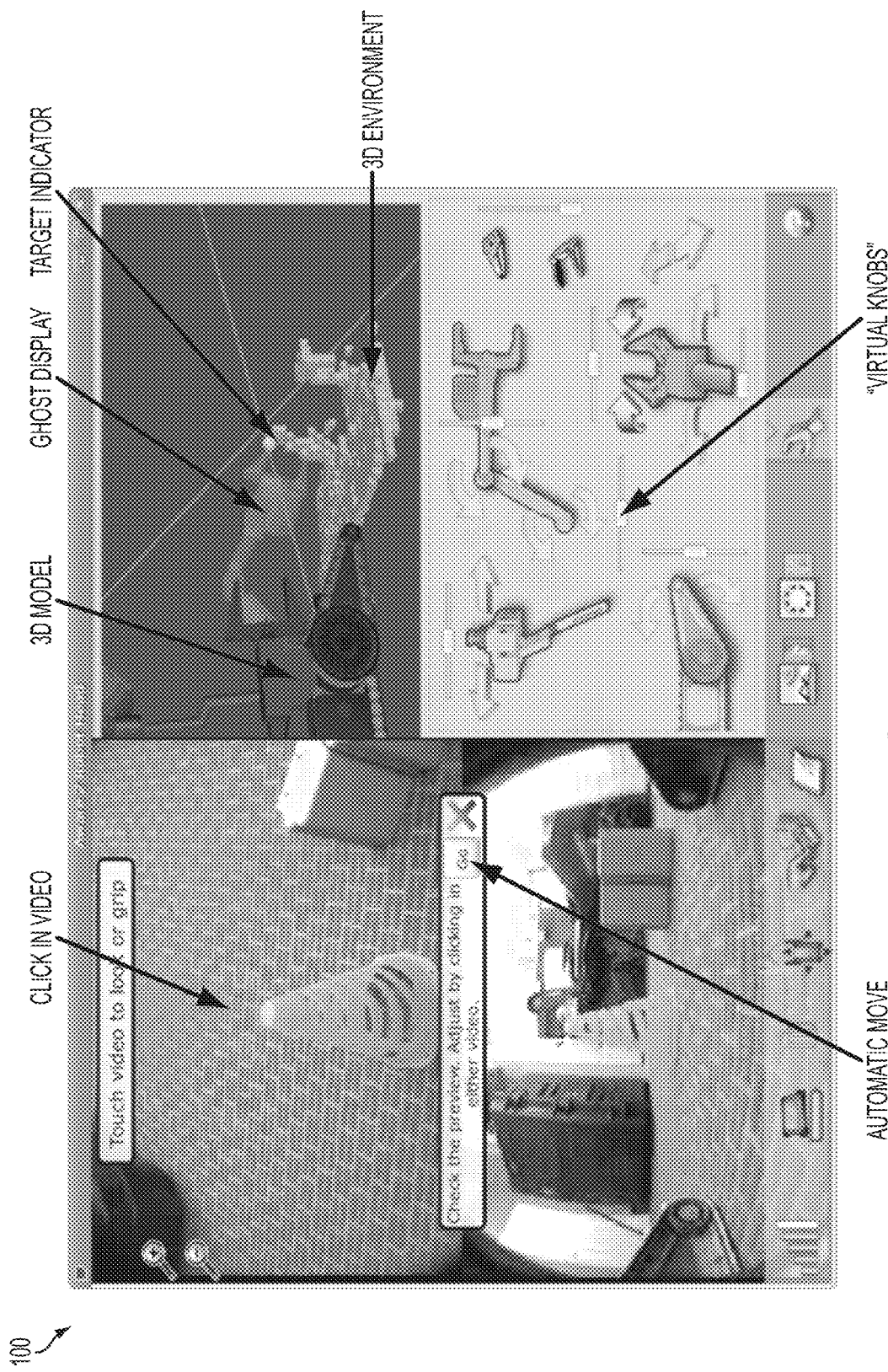
FIG. 1 includes an interface image of an exemplary embodiment of the present teachings.

Reference will now be made in detail to the present teachings, exemplary embodiments of which are illustrated in the accompanying drawings.

The term remote vehicle, as used herein, comprises vehicles that can be controlled by a remote operator. An exemplary remote vehicle is a mobile robot. A remote vehicle can include environment sensors such as, for example, a laser range finder, a stereo vision camera, a Global Positioning System (GPS), a planar laser-based Simultaneous Localization and Mapping (SLAM) system, and an Inertial Measurement Unit (IMU).

Remote vehicles can include controllable parts/elements such as a mechanical manipulator arm for grasping, lifting, and carrying tangible elements. A remote vehicle can be completely autonomous, finding and recognizing tangible elements within its immediate environment, or an operator with an operator control unit (OCU) can identify tangible elements through sensor systems such as the ones listed above and in U.S. patent application Ser. No. 13/105,883, filed May 11, 2011, titled Navigation Portals for a Remote Vehicle Control User Interface.

An environment can be defined as a physical area that has a defined coordinate system with a localization strategy and a planning strategy, each of which is effective for its environment. For example, an outdoor environment can be defined by a GPS-based coordinate system with a waypoint planning path strategy and GPS-based localization. An indoor environment can be defined or represented by a planar laser-based SLAM strategy to define its coordinate system, and can utilize path planning. Other environments can use, for example, a 3-dimensional (3D) volumetric picture element (VOXEL)-based representation of an area based on stereo-vision information about the area, a 3D-based SLAM, or SLAM for a predetermined remote vehicle sensor.

A tangible element can include any object of a size, shape, texture, physical constitution, and weight. In certain embodiments, the remote vehicle can be capable of manipulating particular objects depending on the features of the vehicle (e.g., grasping capabilities of a mechanical arm therein) and the characteristics of the particular element (e.g., size of the particular element). For example, a robot including a mechanical manipulator arm may only grasp objects of up to a certain size and/or may only lift objects of up to a certain weight. The present teachings relate to a control system interface to control a remote vehicle to manipulate an object, and thus, are not limited a specific vehicle or by the characteristics of an object to manipulate.

Remote vehicles can ascend stairways, open doors and traverse doorways, and can perform other types of transitions that allow the remote vehicle to travel between one place and another seamlessly. For example, a remote vehicle with stair climbing ability can climb stairs indoors and get to a new floor, where the remote vehicle would need to start a new map for the new floor of the building, as explained in detail in U.S. patent application Ser. No. 13/105,883, filed May 11, 2011, titled Navigation Portals for a Remote Vehicle Control User Interface. Although exemplary embodiments herein are directed to remote vehicles, the invention is not so limited. For example, the present teachings may be applied to stationary remote vehicles or to vehicles that have an on-board operator.

FIG. 1 shows certain aspects of the present teachings. In particular, FIG. 1 shows a user interface displayed on an operator control unit for controlling a remote vehicle. The user interface image includes four sub-images (hereinafter referred to by their screen position), each of which provides information or facilitates input for controlling a remote vehicle. The arrangement and format of the user interface image shown in FIG. 1 is exemplary and other arrangements and formats can be used in accordance with the present teachings without departing from the scope and spirit of the present teachings.

The upper left image of the user interface image of FIG. 1 shows an image captured by the remote vehicle by, for example, a first video camera on (or directed to record an environment of) the remote vehicle. The first video camera can be, for example, located near a distal end of a manipulator arm of the remote vehicle or on the head of the remote vehicle. The lower left image of the user interface of FIG. 1 shows another image captured by the remote vehicle by, for example, a second video camera on (or directed to record an environment of) the remote vehicle. The second video camera can be, for example, a drive camera for the remote vehicle.

The upper right image of the user interface image embodiment of FIG. 1 shows a 3D representation of an environment in the vicinity of the vehicle, including a 3D model of the vehicle and a 3D representation of a tangible element present in the environment (the tangible element also being referred to hereinafter as a "target"). The target may correspond to an object shown on the upper left image and/or the lower left image. 3D representations of other tangible elements present in the environment may also be shown.

To depict the 3D model of the vehicle, position sensors in the vehicle are used to articulate a model that can be displayed in 3D. The 3D local perceptual space from the vehicle is then drawn in the correct position relative to the vehicle within the 3D representation of the environment, including some or all tangible objects present in the environment. Tangible objects are captured, for example, using known-in-the-art stereo-vision techniques and range finding data, and may be processed and displayed based on on-line stereo object processing of volumetric picture elements (VOXELs).

Thus, the upper right image can depict a 3D environment surrounding the remote vehicle in VOXEL format, as well as, for example, a 3D model of the particular vehicle within its environment. Both the 3D model of the vehicle and its 3D environment can be updated dynamically in real-time when the user selects actions to be performed by the vehicle (as will be explained later in the application) and/or as the vehicle performs such actions (e.g., positioning a manipulator arm to grasp a target object).

As explained below, a target for manipulation can be selected in the upper left and lower left video images, and the coordinates of the selected target can be used to triangulate and create the 3D image of the object in the upper right image of the user interface of FIG. 1.

The lower right image of the user interface image of FIG. 1 shows visual representations of a plurality of controllable elements of the vehicle, for example icons allowing user input to control a manipulator. The icons can include, for example, arrows allowing a user to move a controllable element in an indicated direction and control a speed with which the controllable element moves in the direction, and "virtual knobs" or sliders used to create a ghost image of the controlled element in the upper right 3D display, the ghost image representing how a command would move the controllable element within its environment and relative to other elements of the environment. In certain embodiments of the present teachings, the slider can be dragged to view a ghost image of the controllable element (e.g., by mouse clicking on the slider button and dragging the slider button) and, if the user determines that the ghost image is an acceptable result, the user can release the mouse so that controllable elements moves in accordance with the previewed ghost image. Controlling an exemplary controllable element will be described in more detail later in the application. In the exemplary embodiment described herein, the controllable elements include a robot head, a robot flipper, a manipulator arm, and a gripper on the manipulator arm. However, those skilled in the art will understand that the present teachings can be applied to a variety of other controllable elements.

An icon bar, for example as shown superimposed over the lower right and left images (i.e., along a bottom) of the user interface image of FIG. 1, includes a plurality of icons for selecting functions of the user interface. A person skilled in the art would understand that the location, size, and other characteristics of the icon bar shown in FIG. 1, and the icons therein, are exemplary and can vary to accommodate designer and user preferences, as well as system capabilities.

Embodiments of the present teachings can include one or more message "pop-up" windows that are displayed, as shown in FIG. 1, to provide feedback and/or instructions to the user regarding the functionality of the interface or the remote vehicle being controlled. A person of ordinary skill in the art would understand that the format and position of feedback and/or instructions shown in FIG. 1 is an exemplary implementation of the present teachings, and that there may be other ways in which such information can be presented to the user without departing from the scope and spirit of the present teachings. For example, the instructions can be provided via voice prompts.

FIGS. 2-5 show an exemplary embodiment of the present teachings in which the user controls a controllable element of the vehicle using a control system interface in accordance with various embodiments of the present teachings. The user interface illustrated in FIGS. 2-5 varies slightly from the user interface illustrated in FIG. 1, but can be used in the same way to control various elements of a remote vehicle. For simplicity, description of elements similar to those described with respect to FIG. 1 would be understood by those skilled in the art and therefore will be omitted.

Figure 2:
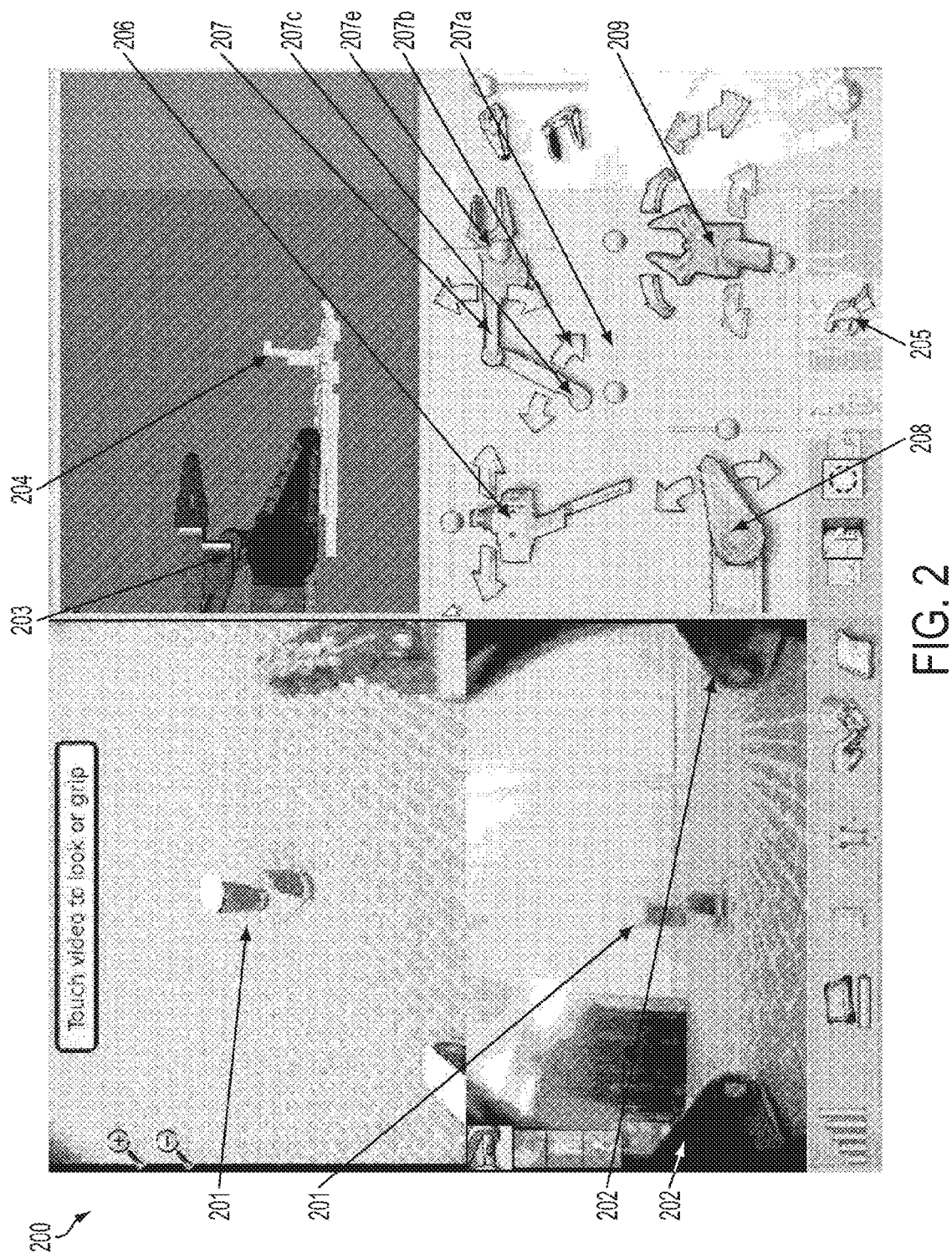
FIG. 2 includes another interface image of an exemplary embodiment of the present teachings.

FIG. 2 shows an exemplary user interface image (200) of the present teachings. The upper left portion and the lower left portion of the user interface show images of a target object (201) captured by separate cameras (not shown) attached to a remote vehicle (202). The cameras preferably provide differing views of the remote vehicle's environment, to aid in triangulation and creation of the 3D image in the upper right portion of the interface. The upper right image shows a 3D representation of the environment at the location of vehicle (202), including a 3D model (203) of vehicle and a 3D model (204) of the target object. The lower right image shows visual representations of a plurality of controllable elements of the vehicle (206-209).

Once a user sees a target (201) in the two video views shown in the upper left and lower left portions of the illustrated interface, to control a vehicle to grasp the target, a user can enter a "Manipulation Mode" by selecting icon 205 of the user interface image. In the illustrated interface exemplary embodiment (a touch-screen display), icon 205 can be selected by touching the screen at the location of icon 205. However, the invention is not limited to a touch-screen-based interface. A person of ordinary skill in the art would understand that functionality such as selection of an icon or selection for entering Manipulation Mode may be accessed/requested via other means, for example by using a computer mouse or a joystick, without departing from the spirit of the present teachings. One skilled in the art will understand that the layout of the interface can be changed in a variety of ways without departing from the true scope and spirit of the present teachings, including rearrangement of the four quadrants of the interface.

When the user enters Manipulation Mode, the vehicle may assume a default manipulation pose. For example, the default manipulation pose can include unfolding an arm element (207) and rotating a flipper element (208) forward to contact the ground, thus increasing the vehicle's stability during manipulation. In Manipulation Mode, a manipulation-specific interface can populate the lower right portion of the screen as shown, and the user can select a controllable element from the lower right image and, in the illustrated embodiment, manipulate the element in two ways. First, the user can manipulate one or more controllable elements (in the illustrated embodiment a flipper, a head, and a manipulator arm having a distally-located gripper) by touching the screen (e.g., with a stylus or a finger) or using a mouse to click on the arrows surrounding the element that indicate a desired direction. Touching or clicking on the arrows can cause immediate movement of the element in the desired direction. Second, the user can manipulate the one or more controllable elements by touching or clicking on a corresponding slider button and dragging the slider button within the slider track in a desired direction. Actuation of an element via its corresponding slider(s) can follow a direction depicted by adjacent arrows. For example, adjustment of virtual knob (207a) by sliding the virtual knob's or slider button's dial to the right (in the direction depicted by arrow (207b) moves a "ghost" representation of element (207) and/or other structure including an arm and a vehicle on which the element is located (on the upper right image) to the right with respect to a pivot point (207c). In certain embodiments, when a user releases the slider button, the actual element will move to the position represented by the ghost image.

Figure 3:
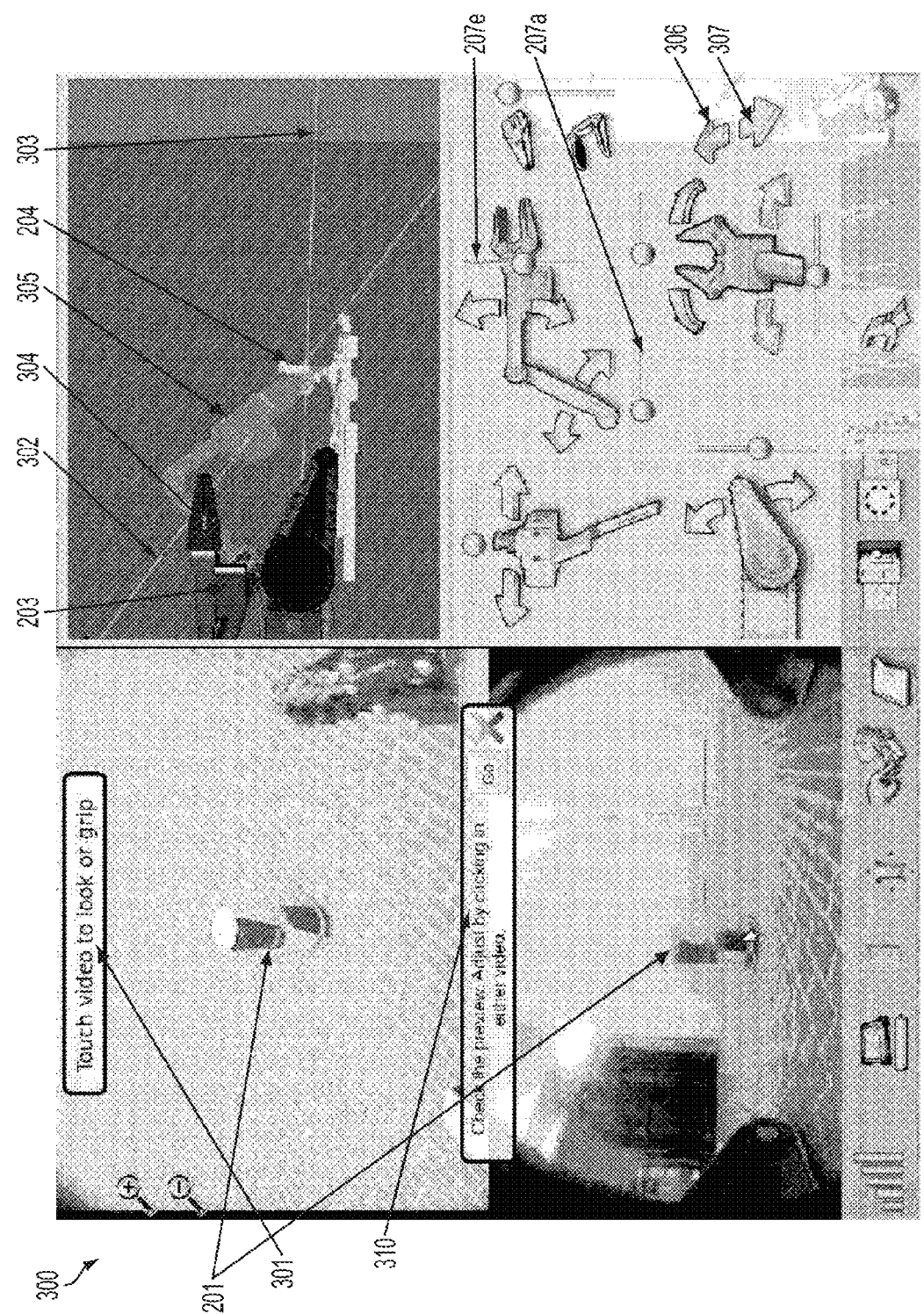
FIG. 3 includes yet another interface image of an exemplary embodiment of the present teachings.

FIG. 3 provides a screen shot of an exemplary user interface (300) of the present teachings, controlling a controllable element. A user can instruct the vehicle (202) to perform a grasping action by simply identifying a target object to grasp (201) in the upper and lower left images, and then can control a manipulator arm of the remote vehicle arm in real time or near real time to grasp the target object (201). Identifying a target object to grasp can include selecting the target object on the upper left image, and selecting the target object on the lower left image. In certain embodiments, the user interface can prompt the user to select the target object using "pop-up" windows (301, 310) superimposed on the upper and lower left images of FIG. 3, and, in certain embodiments, the control unit can determine automatically how to drive the remote vehicle and manipulate the arm of the vehicle (202) to drive the gripper to a predetermined distance of the target object (201).

For example, selecting object 201 on the upper left image can cause a line (302) to be drawn on the upper right image, and touching object 201 on the lower left image can cause another line (303) to be drawn on the upper right image. The intersection of the lines (302) and (303) determines the location where the gripper (304) would need to be located to reach object 201 (a 3D representation of target object (204)). Certain embodiments of the present teachings contemplate moving the remote vehicle to grip the target or to place the gripper within a predetermined distance from the target. In certain embodiments, a "ghost" image (305) of the arm extended to reach the target (204), as depicted in FIG. 3, can be provided in the 3D image located in FIG. 3 in the upper right portion of the display. The ghost image can be accepted by the user or rejected.

In certain embodiments of the present teachings, the user can adjust the lines (302, 303) by re-selecting the target object (201) on one or both of the upper and lower left images, to adjust where the intersection is located and thus where the gripper will be directed. In detail, to create the 3D representation of the environment, the user may be prompted to select a target in the top right video display using a "pop-up" window 301 as shown in FIG. 3. Once the user selects target (201) in the top left video display, the system draws line (302) from the vehicle to the location of the click on the upper left image. The system may then prompt the operator through a second "pop-up" window 310 to click on the same target (i.e., 201) in the bottom left video display. After the user clicks on target (201) in the bottom left video display, the system draws a line (303) from the remote vehicle to the location of the second click. The intersection point of the two lines can be represented by a symbol (e.g., a sphere, a star, or a target symbol (not shown)) in the 3D image at the upper right portion of the display.

In various embodiments, when the user makes further adjustments to the manipulator arm position, the target lines can disappear and the intersection point symbol can remain in the 3D image for reference. Once the target has been grasped, the operator can continue to use the bottom right panel (both the arrows and the virtual knobs) to move the arm, and can issue a drive command, for example in one of the left images. Before moving to a different location, the remote vehicle can configure to a "safe" pose (for example, moving the manipulator arm toward a stowed position for driving, without sacrificing its grip on the target) before the remote vehicle starts driving as commanded. In certain embodiments, the Manipulator Mode can be exited, and the upper and lower right images can be closed, by clicking on the gripper icon (205).

In various embodiments of the present teachings, the user can alternatively or additionally manipulate a mechanical manipulator arm of vehicle (202) to reach the target object (201) by adjusting one or more corresponding virtual knobs (e.g., 207a, 207b) and/or velocity arrows (e.g. 306, 307). During manipulation via virtual knobs, the upper right image can show a "ghost" 3D representation of the selected adjustments. The user can accept the ghost image configuration, for example by releasing the virtual knob/slider button. The upper right image of FIG. 3 shows a "ghost" position (305) of an arm toward the target after adjustment of virtual knob 207a and extended after adjustment of virtual knob 207e.

The "ghost" position may update in real time or near real time as the virtual knobs are adjusted. The actual remote vehicle position can remain unchanged as virtual knobs are adjusted, for example until further instructions are received. In certain embodiments, one or more virtual knobs can be adjusted prior to allowing the remote vehicle to assume the position represented by the ghost image. The "ghost" position provides the user with a preview of how the vehicle's actual arm would move if and when the user instructs the vehicle to perform the "ghost" action.

Figure 4:
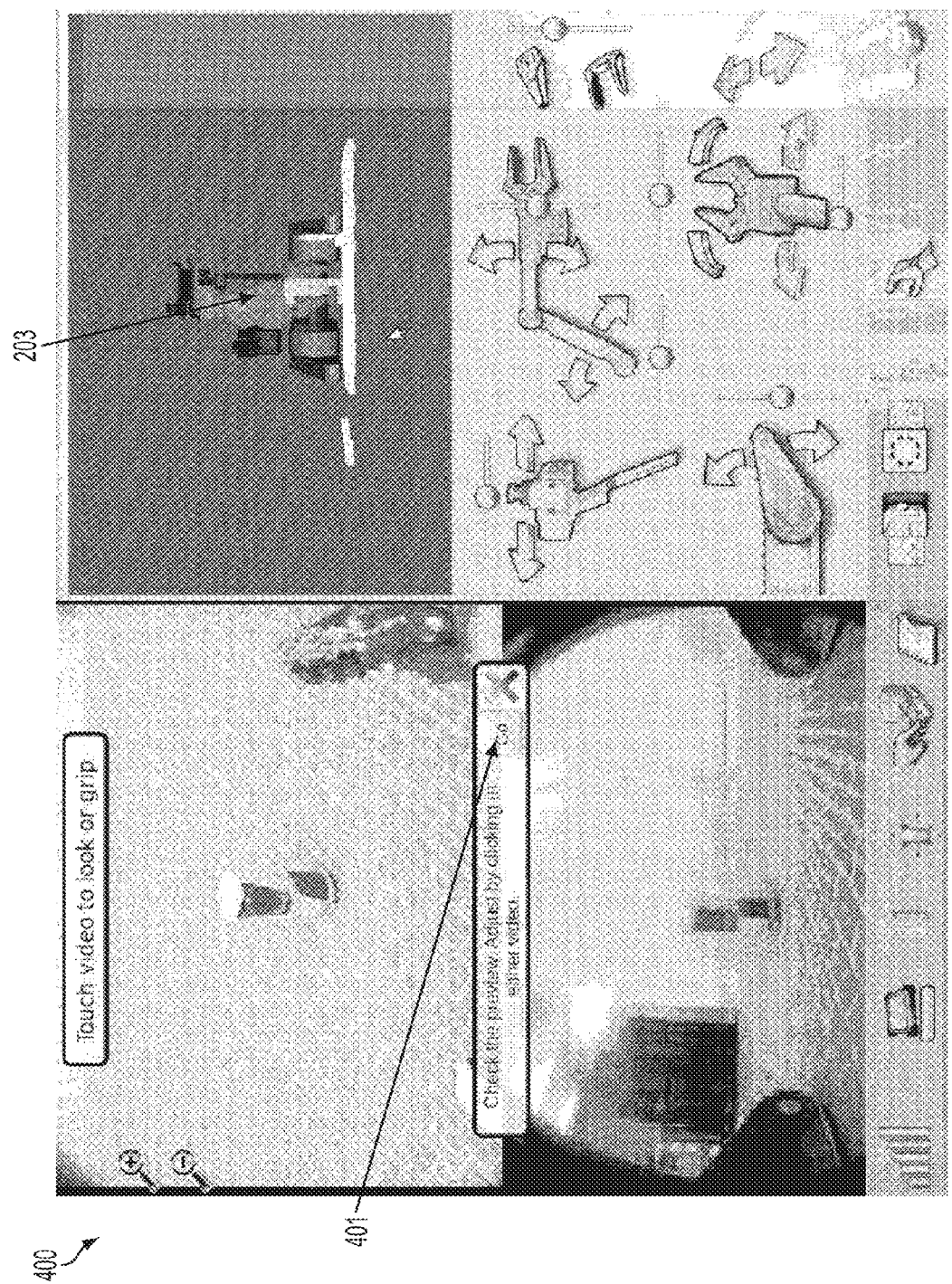
FIG. 4 includes yet another interface image of an exemplary embodiment of the present teachings.

FIGS. 3 and 4 show exemplary user interfaces according to the present teachings in which a "pop-up" window (310) above the lower left image includes a button labeled "GO" (401). In certain embodiments, when the user wants the gripper to move to the position depicted by "ghost" image (305), the user can touch the "GO" button to cause the vehicle to move the gripper to the position depicted by the "ghost" image. In other embodiments, such a "GO" button could be used to create the 3D image after the target has been identified in the two video feeds, or when the user accepts the 3D image created from target identification in the video feeds.

In FIG. 4, the upper right image provides a view from an angle different than that of the upper right image of FIG. 3. Specifically, whereas FIG. 3 shows the vehicle and the environment from a side view angle with respect to the vehicle, FIG. 4 shows the vehicle and the environment from a front view angle with respect to the vehicle. In accordance with various embodiments, a user can manipulate the view angle of the upper right image by, for example, touching the screen with a stylus or finger and sliding/swiping the stylus/finger across a portion of the upper right image. The direction of the sliding/swiping determines a change in view angle and thus an angle in which the 3D representation of the vehicle and the target is shown.

Figure 5:
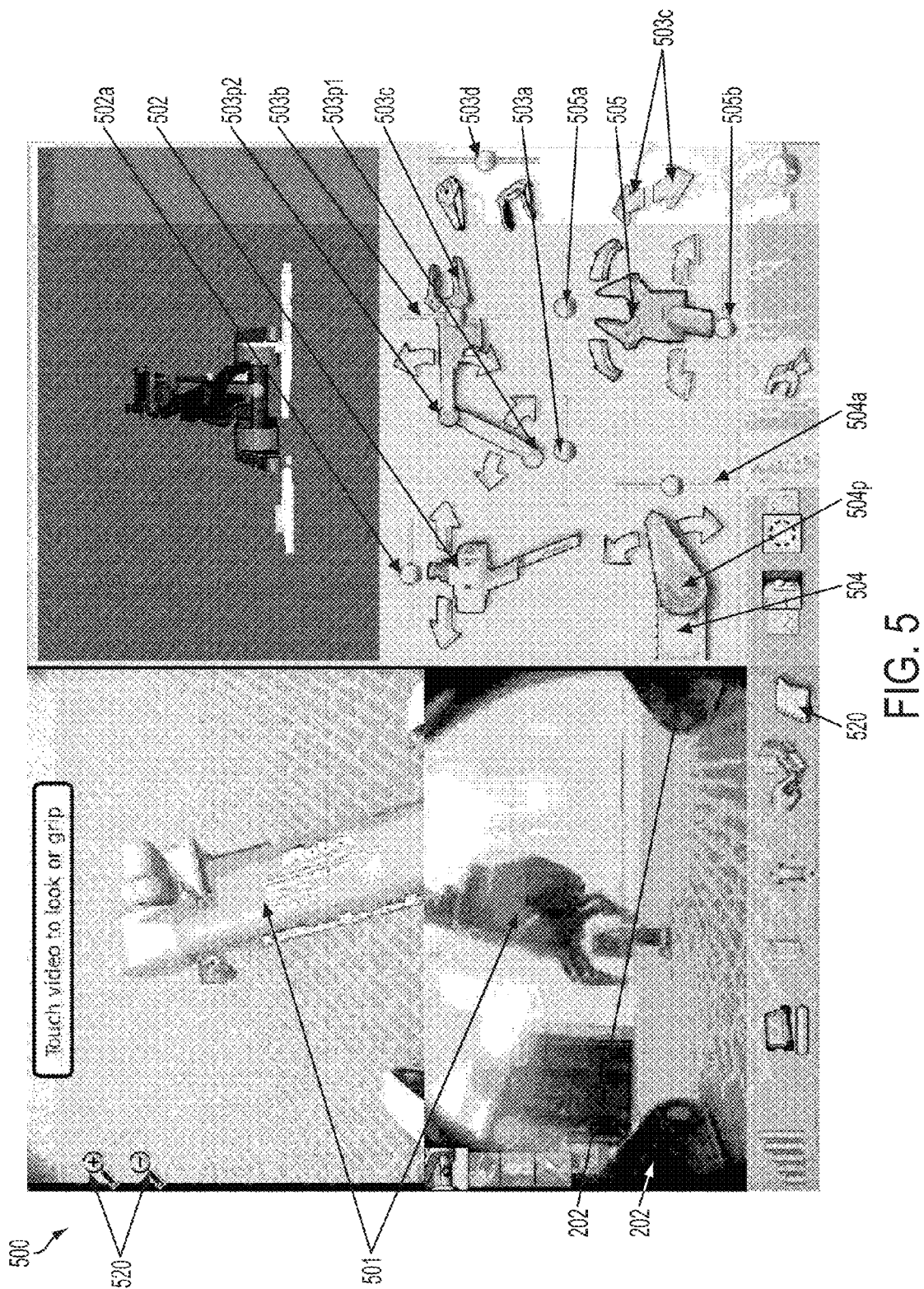
FIG. 5 includes yet another interface image of an exemplary embodiment of the present teachings.

FIG. 5 shows an exemplary user interface image (500) according to the present teachings, in which the gripper is approaching the target to grip it, and the video feeds illustrate the approach in real time or near real time, as does the 3D image. The upper and lower left images of FIG. 5 show the vehicle's arm (501) in a position corresponding to the "ghost" position (305) of FIG. 4. Additional adjustments of the gripper, the arm, the remote vehicle head, and the flippers can then be performed by using "ghost" functions offered by the virtual knobs or by adjustments made by touching or clicking on arrows.

The controllable elements of the exemplary embodiment will be explained in further detail below. A vehicle controlled through a control unit consistent with the present teachings may include none, a few of, or all of the controllable elements disclosed herein, or may include additional controllable elements not disclosed herein. Furthermore, the controllable elements depicted in the lower right corner are directed to manipulation of an object. A vehicle in which the present teachings are practiced can include additional controllable elements directed to other functions. For example, a user interface consistent with the present teachings may also control movement and location control of the vehicle by, for example, applying the teachings in U.S. patent application Ser. No. 13/105,883, filed May 11, 2011, titled Navigation Portals for a Remote Vehicle Control User Interface.

The lower right image of FIG. 5 includes the following controllable elements: a robot head (502); a robot arm (503); robot flippers (504); and a robot gripper (505). Each of the controllable elements includes "virtual knobs" for which moving (or sliding) the virtual knob causes the element to move in a corresponding direction represented as a corresponding arrow.

With respect to robot head (502), the sliding of virtual knob (502a) to the right or the left causes robot head (502) to move to the right or the left, respectively. In the exemplary vehicle, movement of virtual knob up and down can correspond to movement of the robot head forward and backward (i.e., the view of element 502 in the lower right image is from a side view with respect to the vehicle). However, the present teachings are not so limited, and other vehicles may include a robot head capable of additional movements.

Robot head (502) can further include a video camera (not shown), and the functionality of such camera can be controlled through a user interface in accordance with the present teachings. Camera control can include image capture, video capture, zoom, and any other known-in-the-art function associated with a camera. In the exemplary embodiment, camera functions can be accessed through an icon (520), and may be accessed by a variety of methods without departing from the scope and spirit of the present teachings. For example, a user may click within one of the video displays to control the camera to center/focus the camera on different objects in the image, zooming the camera as needed if the camera includes a zoom feature. Zooming the image can be accomplished by clicking on specific icons (e.g., plus and minus icons (520)).

In certain embodiments of the present teachings, robot head (502) can also be controlled by clicking the upper left image. In particular, in the exemplary embodiment, clicking on a location in the upper left screen may control the vehicle, and particularly the robot head (502), to move such that the attached camera may be directed to the clicked location.

With respect to robot manipulator arm (503), sliding of virtual knob (503a) to the right or the left causes robot manipulator arm (503) to move accordingly with respect to a pivot point (503p1). As with robot head (502), the view of manipulator arm (503) in the lower right image is from a side view with respect to the vehicle, but such implementation is exemplary and non-limiting.

Sliding of virtual knob (503b) up or down causes the portion of robot manipulator arm (503) between pivot point (503p2) and the arms gripper (503c) to move up or down accordingly with respect to pivot point (503p2). With respect to gripper (503c), its gripping mechanism is controlled through virtual knob (503d). Sliding of the virtual knob towards the image of a closed gripper closes gripper (503c), and sliding of the virtual knob towards the image of an open gripper opens gripper (503c).

With respect to robot flipper (504), sliding of virtual knob (504a) up or down causes robot flipper (504) to move accordingly with respect to pivot point (503p1). As with robot head (502), the view of element (504) in the lower right image is from a side view with respect to the vehicle, but such implementation is exemplary and non-limiting.

Robot gripper (504) is a detailed view of gripper (503c) of robot manipulator arm (503). The more detailed representation provides control of additional grip-related function. Sliding of virtual knob (505a) left or right causes robot gripper (505) to move counter-clockwise and clockwise, respectively. Sliding of virtual knob (505b) left or right causes robot gripper (505) to move accordingly with respect to pivot point (503p1).

Robot gripper (504) may further be controlled to move forward and backward while maintaining its level/angle substantially constant by clicking forward-backward arrows (503c). In particular, to maintain the level of the gripper relative to a horizontal line, robot manipulator arm (502 may need to move simultaneously with respect to pivot points (503p1) and (503p2). Forward-backward arrows (503c) provide such functionality, obviating the need to control virtual knobs (503a) and (503b).

In view of the functionality above, an exemplary embodiment of the present teachings can be employed to control a remote vehicle operating in an environment where human manipulation of a target objet may be dangerous. For example, a member of a bomb squad may use an embodiment of the present invention to manipulate and dispose of an improvised explosive device (IED).

In particular, a remote vehicle can be driven to a location in which an IED is located (as described, for example in U.S. patent application Ser. No. 13/105,883, filed May 11, 2011, titled Navigation Portals for a Remote Vehicle Control User Interface). The remote vehicle can be controlled using the above-described control system interface to enter a populated area, obtain visual confirmation of the target object using an attached camera, grasp the target object, and transfer the target object to a location suitable for disposal.

Figure 6:
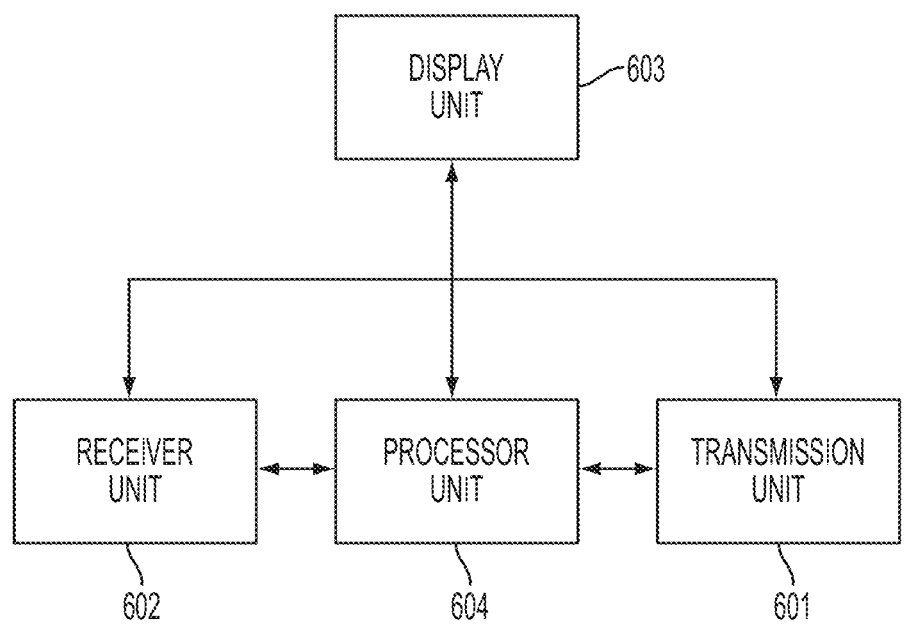
FIG. 6 includes an exemplary embodiment of an operator control unit consistent with the present teachings.

FIG. 6 shows an operator control unit (600) having a user interface that allows a user to control a remotely-located vehicle consistent with the present teachings. The OCU (600) includes a transmission unit (601) capable of transmitting data to a remote vehicle, a receiver unit (602) to receive data from the remote vehicle, a display unit (603) to display a user interface image consistent with the user interface images described above with respect to FIGS. 1-5, and a processor unit (604) to process the functionality of the OCU.

Transmission unit (601) and receiver unit (602) can include at least one of a plurality of known communication technologies, including but not limited to, short range communication technologies such as Bluetooth and IEEE 802.11, and mobile communication technologies such as TDMA and CDMA. Other communication technologies may be used without departing from the scope and spirit of the present teachings.

Display unit (603) can be a known-in-the-art touch-screen display such as those commercially available with Hewlett-Packard® Tablet PC® computers or with Apple® iPad® computers. If a touch-screen-capable display is used, the OCU can be controlled by touching the display. Display unit (603) can also be a known-in-the-art computer monitor, in which case the OCU can be controlled through known input devices such as a computer mouse and a computer joystick.

Processor unit (604) controls the functionality of the OCU and can include one or several processors and memory devices. Functionality of the processor unit (604), and of other elements of the OCU, can be controlled through computer-executable programs stored in tangible computer-readable media.

Exemplary Missions

A remote vehicle equipped with appropriate hardware and software as described herein and in: U.S. patent application Ser. No. 13/105,883, filed May 11, 2011, titled Navigation Portals for a Remote Vehicle Control User Interface; U.S. patent application Ser. No. 12/916,482, filed Oct. 29, 2010, titled Remote Vehicle Control System and Method; and U.S. patent application Ser. No. 13/105,872, filed May 11, 2010, titled Advanced Behavior Engine, the entire disclosures of which are incorporated herein by reference, can be used to perform a variety of missions. For example, a properly equipped and configured remote vehicle can be used for building and area clearance, EOD operations, tunnel and cave exploration, persistent stare and perimeter surveillance, and route, minefield, and hazardous material (HazMat) clearance.

The remote vehicle can comprise, for example, an iRobot® 310 SUGV, an iRobot® 510 Packbot, an iRobot® 710 Warrior, or similar systems. In accordance with certain embodiments of the present teachings, the remote vehicle head, which can be consistent with the remote vehicle head described in detail in U.S. patent application Ser. No. 12/916, 482, filed Oct. 29, 2010, titled Remote Vehicle Control System and Method, can have dimensions of 4"×8"×8" and can weigh less than 6.5 pounds. The remote vehicle can include an integrated sensor platform comprising dual CPUs, 2D and 3D depth and range sensors, a GPS, an IMU, an integrated digital radio with multiple frequency options, and multiple cameras including a wide-field-of-view/zoom camera and a visible/infrared camera.

Exemplary implementations of the operator control unit can include a pocket-sized device for dismounted operations or a tablet-PC or similarly-sized device for mounted operations.

The system can employ an advanced behavior engine such as the engine described in U.S. patent application Ser. No.

13/105,872, filed May 11, 2010, titled Advanced Behavior Engine or U.S. patent application Ser. No. 12/100,782, filed Apr. 10, 2008, an exemplary embodiment including the iRobot® Aware 2 core robotic control software, for example with a SAE AS-4 protocol adaption layer.

For building and area clearance, the remote vehicle can be used to autonomously explore urban environments and generate a detailed map of the terrain, structures, and threats, before personnel are sent into the area. Remote vehicles can examine environments (both line-of-site and non-line-of-site), map terrain structures and threats, and allow investigation and elimination of identified threats before personnel are sent into the area. The remote vehicle operator can retain more situational awareness and experience less sensory overload because the present teachings provide a more intuitive user interface and autonomous and semi-autonomous behaviors. For example, the remote vehicle can be driven with high-level tasking commands such as, for example, waypoint navigation, perimeter following, and street following, allowing the operator to use cameras to pan and scan the interior and exterior of a building. The remote vehicle can automatically generate a map of a building interior and allow operators to mark the map with images, sensor data, or other critical information. The remote vehicle can use marked waypoints in the building to travel back to and reinvestigate suspicious targets of interest.

For explosive ordnance disposal (EOD) operations, a remote vehicle in accordance with the present teachings can be semi-autonomously driven to the location of a suspicious device, allowing the remote vehicle operator to search for secondary threats or pay full attention to personal security. The remote vehicle can also reduce mission time on target. An operator can easily send a remote vehicle to a safe area or to previously-defined points of interest using a click-to-drive feature, for example as detailed in U.S. patent application Ser. No. 13/105,883, filed May 11, 2011, titled Navigation Portals for a Remote Vehicle Control User Interface. In addition, the remote vehicle can generate a map of a scene, enabling continuous operations, allowing for more detailed analysis, and providing more thorough intelligence reporting for example as detailed in U.S. patent application Ser. No. 13/105,883, filed May 11, 2011, titled Navigation Portals for a Remote Vehicle Control User Interface.

In an EOD operation, the remote vehicle can be driven semi-autonomously to the location of a suspicious device using a click-to-drive behavior. During travel downrange, the remote vehicle operator can use cameras to inspect the surroundings or pay full attention to personal security. When the remote vehicle is in range of the suspicious device, a click-to-manipulate behavior, for example as detailed above, can be used to grip the suspicious device if desired.

In tunnel and cave exploration missions, the remote vehicle can be sent in to explore caves, tunnels, or other difficult environments and, for example, identify chemical-biological-nuclear-radiological (CBRN) threats before personnel are sent in. Wireless or wired tethering can be used to maintain communication between the remote vehicle and the operator control unit so that commands can be sent to the remote vehicle and data can be transmitted by remote vehicle. In certain embodiments, the remote vehicle switches to a low-frequency radio for cave exploration, because low-frequency radio waves can penetrate cave and tunnel walls better. Alternatively, the remote vehicle can explore the environment, storing relevant data about the environment, and transmit the data upon exiting the environment or otherwise regaining communication with the operator control unit. Retrotraverse can be used to have the remote vehicle retrace its path if communication is lost during exploration. The remote vehicle can use autonomous behaviors to perform its mission, including exploration and mapping, even without solid and continuous control links. The remote vehicle can also mark areas on the map where it has communication connectivity, so that it can return (e.g., periodically or upon certain conditions) to an area of connectivity to transmit information and/or receive commands.

The remote vehicles can autonomously explore and investigate culverts, tunnels, and caves, generating detailed maps thereof. The remote vehicles can mark the map(s) with 360° snapshot images, CBRN and buried object sensor data, and other critical information. The remote vehicles can autonomously approach a suspicious object and allow the operator to investigate it, and can share video, sensor, and map data with other remote vehicles and units being deployed, for example allowing a follow-on asset to go directly to a location of a suspicious object while assessing the shared information. Image, telemetry, and sensor data can be transmitted over low bandwidth and low frequency links that perform well in difficult environments.

Remote vehicles can also perform persistent stare and perimeter surveillance missions, allowing operators to monitor operations from a safe standoff distance. The remote vehicle can autonomously follow a previously-defined path while using obstacle detection and avoidance and tagging a map with images, sensor data, and other critical information and/or transmitting such data in real time. The remote vehicle can move from outpost to outpost, monitoring suspicious locations at known headings from known positions for scheduled amounts of time. The remote vehicle can inform the operator and/or other personnel (e.g., a command center) when there is a change in a scene, sensor data, and/or other critical information, allowing the operator to monitor a situation without a significant investment of time in video analytics.

In missions to clear a route, a minefield, or hazardous materials, the remote vehicle can be equipped with appropriate sensors and commanded to sweep an area or roadway and generate a detailed map, helping route clearance teams investigate threats from a safe standoff distance. The operator and the remote vehicle can mark the map with images, CBRN, and buried object sensor data, and other critical information. For example, one or more remote vehicles can be deployed by a route clearance team when a convoy is stopped due to an obstacle or general suspicion. The remote vehicle(s) can scan the roadway for shallowly-buried objects and other hazards, sweep a given area for mines and other explosives, and identify suspected CBRN threats. The remote vehicle(s) can help the route clearance team investigate known and potential threats from the safety of cover and concealment, by autonomously approaching a suspicious object and helping operators investigate it. Remote vehicles that are tasked with clearing a route or area can share video, sensor data, and map data among themselves and/or with other remote vehicles and deployed units, allowing follow-on assets to go directly to the location of a suspicious object while assessing the shared data.

Other operator-assist behaviors utilized in accordance with the present teachings for use in the above-mentioned mission can include: (1) map-based click-to-drive with obstacle detection and avoidance, wherein an operator marks a target location on a map and the remote vehicle navigates to the target location, detecting and avoiding obstacles on the way; (2) map-based navigation using GPS with obstacle detection and avoidance; (3) feature tagging in the map-based interface, allowing the operator to mark a map with images, sensor data, and other critical information throughout a mission; (4) retro-traverse on communication loss, allowing the remote vehicle to retrace its path until communications are restored; (5) automatic self-righting; (6) indoor and outdoor 2D mapping; (7) click-to-manipulate with 3D visualization as described above; and (8) shared 3D perceptual space. Other autonomous and semi-autonomous operator-assist behaviors can include cruise control, perimeter following, and street following. These behaviors, along with a more intuitive GUI described hereinabove, can reduce the amount of operator training needed and can allow the operator issue high-level mission control commands that then allow the operator to pay more attention to other tasks during missions. Mission tasking control increases the remote vehicle's ability to autonomously perform high-level tasks and function as a teammate.

In various embodiments of the present teachings, the interface can facilitate post-mission analysis. For example, personnel can retrieve a mission database from the remote vehicle and review mapping (e.g., geo-referenced maps, tags, pictures, and notes), video feed, and/or other sensor data retrieved by the remote vehicle. The offline reviewer can provide additional tags and notes that can optionally be saved in the database for future review. In certain embodiments, the reviewer's additional tags and notes are stored in volatile memory and are lost when the system is powered off, unless the additional tags and notes are saved, for example by manually transferring them to an alternate location.

In accordance with various embodiments of the present teachings, methods for conducting a remote vehicle mission can include:

(A) selecting among teleoperation, waypoint-guided, and endpoint-guided piloting strategies for driving a mobile ground robot around one or more of a disembarkation site, a safe launch site such as a militarily cleared and secure area, e.g., a mission start area such as a tunnel entry, e.g., a strong connectivity area where target radio frequency and bandwidth criteria are satisfied, where different criteria may be satisfied by the same site such that, e.g., the safe launch site and mission start area may be substantially the same site;

(B) initiating a robotic tunnel exploration mission including at least one mission phase, the mission phase being a temporal, task grouping, or other mission subdivision having, e.g., a beginning and an end or defined criteria, in which known rules of engagement, procedures, and preferred tactics are followed;

(C) creating and/or using a top-down coordinate (e.g., Cartesian) map including at least one of coordinates, occupancy map, free space map, connectivity success map, and photographic map, the connectivity success map including data rate and/or bandwidth and/or reliability for RF connections, in different frequencies, available to the remote vehicle;

(D) marking the top-down coordinate map with identifiers capable of being selected (e.g., via 2D touch panel user interface click, swipe, pinch, touch sensing) and interpreted to recall photographs or high-rate (e.g., "HD" or "720P" video) taken by the remote vehicle at the coordinates of a known view angle and direction (e.g., 60° view angle at 45° from magnetic north, 360° view angle with no direction);

(E) following a tactical approach to a known suspicious object, including identifying target coordinates of the known suspicious object on the top-down coordinate map and following a set of sequential or non-sequential state machine steps from a present location to the target coordinates, including steps of incremental advance, surveying and checking surroundings, slow advance, RF-silent advance, CBNRE scan at predetermined stand-off distance, circle and collect different directional views and return to stand-off, deposit ordnance or sensor package and retreat);

(F) recording, and/or transmitting and/or sharing real-time or recorded video, real-time or recorded sensor data or telemetry, real-time or recorded map data, each of video, sensor, and map data being recorded and/or transmitted and/or shared to a local data storage (e.g., a control truck or operator control unit), a local IF repeater (e.g., a bridge or repeater which receives a signal from the remote vehicle, optionally changes its frequency and/or band, optionally amplifies, and retransmits), or a remote data storage (e.g., via a radio link or a satellite link to a stationary or mobile C4ISR command and control); and/or (G) re-recording, and/or receiving and/or sharing real-time or recorded video transmitted from a different remote vehicle or sensor group as in (F) from a local data storage, local IF repeater, or remote data storage;

(H) recording, re-recording, transmitting and/or receiving and/or sharing real-time or recorded video as in (F) or (G) over "low" bandwidth (e.g., less than 5 Mbits/s) and/or low frequency (e.g., less than 2.4 GHz, preferably less than 1 GHz). As an example, the video can be recorded, re-recorded, transmitted, received, or shared over one of FM microwave, UHF, L, S, C or X bands. In tunnels, 200-500 MHz UHF band may be preferred. For partially obstructed line of sight, L band may be suitable. For unobstructed line of site, C or X band may be used. In each case, COFDM modulation over many (1000's) of carriers and 4-10 MHz of bandwidth, diversity reception, maximum ratio combining, and/or error correction streams may be used. Links can be utilized that perform well in difficult environments recording and/or transmitting and/or sharing real-time or recorded video at fractions of real-time bandwidth. For example, 10 minutes of real-time video can be transmitted over 30 minutes of continuous or intermittent communications, and/or transmitted in 10 minutes at higher compression/lower resolution);

(I) using autonomous behaviors to perform (e.g., room, tunnel, corridor, perimeter, path) exploring and mapping, including using behaviors that use machine vision techniques (e.g., SIFT) to identify landmarks and/or an Inertial Measurement Unit (including one or more accelerometers and/or rate gyroscopes) to conduct exploration beyond radio range and return/retrotraverse to radio contact using landmarks and/or waypoint recordings of IMU data, as well as using a set of sequenced behaviors to form an autonomous sequence, a set of sequenced behaviors optionally including one or more stand-alone behaviors started or continued when a sensor condition is satisfied, and/or sequence-able behaviors started or continued when either a sensor condition is satisfied or a preceding behavior succeeds and/or finishes;

(J) re-recording, and/or receiving and/or sharing real-time or recorded connectivity information in the same or similar manner as video, sensor data, or map data as in (F) or (G), in one or more frequency bands identified in (H), to provide identification of areas of secure upload or data streaming for the remote vehicle to return to or proceed to in mission planning, retrotraverse, or sequence, connectivity information being transmitted from the same or a different remote vehicle or sensor group and/or from a local data storage, local IF repeater, or remote data storage;

(K) marking a top-down coordinate map with identifiers capable of being selected (e.g., via 2D touch panel user interface click, swipe, pinch, touch sensing) and interpreted to recall CBRNE and/or sensor data or sweep mapping taken by the remote vehicle at or near coordinates, including but not limited to multi-ion mobility spectrometer, joint chemical agent detector, photoionization detector, gamma and neutron radiation, thermometer, and/or Raman spectrometer data profiles localized at coordinates, mapped in 2D about path coordinates, or mapped in 1D along a path, either in absolute/relative measurements or compared to a library of threat substance profiles;

(L) using autonomous behaviors to sweep an area (e.g., a room, tunnel, corridor, perimeter, path, area, room, road, roadside), including using behaviors that use machine vision techniques (e.g., scale-invariant feature transform (SIFT)) to identify landmarks and/or an Inertial Measurement Unit (including one or more accelerometers and/or rate gyroscopes) and/or odometry or other dead-reckoning sensors and/or GPS or other time-of-flight localization to conduct sweep patterns within or beyond radio range using dead reckoning, landmarks and/or waypoint recordings of IMU data, sweep behaviors being sequenced or generated by scripts as set forth in (I);

(M) using autonomous behaviors to perform persistent stare surveillance, including using behaviors that employ a manipulator and/or mobility of the remote vehicle and/or poses of the remote vehicle and its actuators/sensors to conduct scanning of a sensor head and/or camera head and/or manipulator-distal camera or sensor unit, optionally in combination with machine vision techniques (e.g., SIFT) to set 'video analytics' criteria, alarm conditions, CBRNE sensors, and/or map databases as discussed in (F), (G), or (K) to monitor locations, including those identified as suspicious, to identify or enable an operator to identify a change in scene, a change in sensor data, and/or other monitored criteria as discussed in (F) (G), or (K), including using sequenced and sequenceable behaviors as set forth in (I);

(N) using autonomous behaviors to perform perimeter surveillance, including using behaviors that use manipulator and/or mobility of the remote vehicle and/or poses of the remote vehicle and its actuators/sensors to follow a pre-defined path while using obstacle detection and avoidance and tagging the map with images, sensor data, and other information (e.g., identifying suspicious locations, objects, and activities), and/or to move from outpost to outpost (e.g., outpost, site, area, or mission phase) at known or programmable headings from known or programmable positions for known or schedulable amounts of time or at known or schedulable times as set forth in (A), optionally in combination with machine vision techniques (e.g., SIFT) to set 'video analytics' criteria, alarm conditions, CBRNE sensors, and/or map databases as discussed in (F), (G), or (K) to monitor locations, including those identified as suspicious, to identify or enable an operator to identify a change in scene, a change in sensor data, and/or other monitored criteria as discussed in (F) (G), or (K), including using sequenced and sequence-able behaviors as set forth in (I); and/or (O) intervening between, preceding, or following any robotic assist, script, process, behavior, or routine as discussed in (A)-(N), permit interruption by full or substantially full manual control by an operator of the remote vehicle and/or its manipulators in real-time to handle and dispose of an unpredictable threat, and permit return to a robotic assist, script, process, behavior, or routine as discussed in (A)-(N).

The frequency bands are alternatively defined as UHF: 340.0-399.9 MHz. L Band including Lower L-Band: 1435-1535 MHz and Upper L-Band: 1700-1850 MHz; S-Band including S-Band: 2200-2399 MHz and ISM S-Band: 2400.00-2499.75 MHz, Dual L/S-Band: 1700-1850/2200-2500 MHz, C-Band: 4400-4999 MHz including Public Safety C-Band: 4940-4990 MHz; X-Band 8/1-8.5 GHz.

With reference to step or act (I), scripts or "mission planning primitives" can be assembled in sequences, and can be combined, and are made up of different kinds of activities, including behaviors, either in programmable libraries or predefined, which can be sequenced or sequence-able, background, or even user interaction behaviors. Background behaviors include behaviors that are not in a linear sequence but are ongoing as one or more other primitives are executed (e.g., obstacle detection and avoidance may not be part of a 'go ahead N meters' primitive, but may be operated in parallel to provide the capability of stopping a remote vehicle from being teleoperated directly or autonomously path-planned over or into a cliff, hole, or wall). User interaction behaviors can pop up optional user interface elements, documentation, or checklists/buttons/verifications.

Again, with reference to step or act (I), a state machine for Tactics, Techniques, and Procedures (TTP) can be assembled of scripted sequences, autonomous missions, assisted teleoperation/piloting/or Waldo activities, or fully manual activities as part of an interactive state machine for TTP. "Waldo" activities can be defined to include direct proportional, velocity, direction, position, or kinematic command of manipulators.

A robotic tunnel exploration mission method can include one or more of steps (A), (B), (C), (D), (E), (F), (G), (H), (I), and (J). In this case, as in other cases discussed herein, several steps are optional. For example, the remote vehicle need not always provide or rely upon shared data as discussed in (F) or (G), but may share in only one direction or not at all; or may have more or less detailed sequence-able scripts or behaviors as discussed in other steps or acts). Other steps or acts in the series (A)-(N) may be added when a mission is more complex (e.g., when a CBNRE threat is expected in a tunnel) or subtracted when a mission is less complex. A robotic CBNRE monitoring or discovery mission may include, in addition or as an alternative to these steps, steps or acts as described in (K). A robotic area or route sweeping mission method may include, in addition or in the alternative, steps or acts as described in (L). A robotic persistent stare surveillance mission method may include, in addition or in the alternative, steps or acts as described in (M). A perimeter surveillance mission method may include, in addition or in the alternative, steps or acts as described in (N).

As described in (O), the methods discussed contemplate that one or more steps or acts may be partially operated by an operator (e.g., via teleoperation or using manually sequenced mission planning primitives). Manual operation may be particularly appropriate for, e.g., a robotic EOD/IED investigation and disposal mission method, which can: (1) begin with scripted or defined approach strategies and tactics as defined by mission TTP in a particular scenario, utilizing various assists such as stair climbing, path following, and threat identification/recording assists; (2) upon reaching the threat be interrupted by full user control and remote piloting of the vehicle and its manipulators in real-time to handle and dispose of an actual EOD, and following the resolution of the threat into a harmless state; (3) transition into assists for secondary threat identification and, upon resolution of the same; (4) ultimately conclude with scripted or defined recovery strategies and tactics as defined by mission TTP, again using various assists to recover the vehicle.

System Infrastructure

In accordance with embodiments of the present teachings, based on hardware and software, the manipulation control panel is a combination of remote vehicle functionality and user interface functionality that support click-to-manipulate, allowing full control of a remote vehicle manipulator without using a joystick or other typically-employed input devices.

An operator can completely control the remote vehicle on a mission using a tablet computer/touch screen, without the need for additional controls.

The manipulation control panel's user interface and system provide multiple levels of control and additional situational awareness to simplify the complex task of manipulation. The multiple levels of control can include:

Situational Awareness for Manipulation
- A 3D real-time model of the manipulation environment is displayed, allowing the operator to see objects and obstacles in 3D. The 3D real-time model is derived from online stereo object processing (e.g., Voxel-based processing).
- A 3D model of the remote vehicle loaded from a file (configurable for any system) is shown in the 3D real-time model of the remote vehicle's environment.
- The camera perspective of the 3D real-time model is adjustable (e.g., in real time).
- Preview "ghosting" of motion commands can be utilized before the remote vehicle moves, allowing the operator see the effects of their actions in context (i.e., in the 3D image) before causing those actions to take place.

Manipulation Control
- Using calibrated cameras, the operator can click in video images received from the cameras and displayed via the user interface to set a 3D target position for the gripper.
- The 3D target position is displayed as a preview, along with an expected "ghosted" position of the arm to reach the 3D target. Previewing the 3D target and expected arm position can increase the operator's confidence in automatic moves and reduces operator surprise.
- The jointed manipulator arm and gripper can be automatically driven to the target position without the need for joint-by-joint control if the operator chooses to do so; however, a seamless interface is also provided, allowing joint-by-joint control to manually position manipulator arm joints while still seeing the "ghosting" of manipulator arm positions resulting from the manual positioning.
- The joint-by-joint control uses a scaling approach for user interface commands, providing high resolution/fine adjustment of the gripper and manipulator arm's position for the "end game" of remote vehicle tasks.
- The joint-by-joint control uses a "virtual knob" user interface, in which the operator can separately control each joint. Virtual knobs can be customized electronically for different remote vehicle systems without changing in the user interface device hardware.

The manipulation control panel's collection of features provides a complete solution for assisting in remote vehicle arm manipulation, reducing time-on-task for the operator, increasing the operator's situational awareness, and allowing smooth integration of autonomous control (autonomously move to target) with manual control (joint-by-joint teleoperation as needed), all using a click-based/touch-based interface approach and no joystick commands needed to complete complex manipulation operations. In certain system embodiments, a fallback of joystick control can also be made available if a joystick is plugged into the system.

In accordance with certain embodiments, each mission can comprise a plurality of remote vehicle actions, and each remote vehicle action can include one or more autonomous or semi-autonomous behaviors. In various embodiments, each mission or remote vehicle action can have one or more of its own user interfaces, such as the manipulator interface described above and the click-to-drive interface described in U.S. patent application Ser. No. 13/105,883, filed May 11, 2011, titled Navigation Portals for a Remote Vehicle Control User Interface. The user can select one or more of the user interfaces appropriate for a mission on both the operator control unit and the remote vehicle, and the operator control unit and remote vehicle can multi-task in the foreground or background, and can call them up as needed.

The Control System

FIG. 6 is a schematic flow chart illustrating initialization and mission selection. Generally, during initialization, each entity in the system runs conventional start-up functions, tests, self-checks, etc. In addition, there are four main authorities in the system that need to discover and exchange detailed configuration and interconnection information from all of the facilities that will play a role in an anticipated mission.

Starting with the "robot brain," a supervisory control unit or supervisory payload needs to initialize, or discover then initialize, the remote vehicle's configuration, including both pre-configured and known motor control, sensors, and existing actuator facilities as well as new ones. A base configuration for a system can include a set of baseline behaviors (e.g., teleoperation, basic obstacle avoidance, map-making) expected as common resources for most if not all missions. For the purpose of discussion, the 'robot head' is identified as the supervisory control unit, but the supervisor 'brain' may reside in the chassis or another payload.

The operator control unit must initialize, or discover and then initialize, the user interface and communications configurations useful for remotely controlling or monitoring the remote vehicle, including both pre-configured and known user interface and input facilities, as well as new ones. A base configuration would include a set of baseline user interface elements and structures (e.g., camera views, maps, remote vehicle models/avatars, toolbars, input mechanisms, and states for using them) that would be expected to be common resources for most if not all missions.

Both the supervisory control unit and the operator control unit can also initialize, or discover and then initialize, historical data of use during a forthcoming mission, including, for example: statistics; guidelines; pre-recorded missions; and pre-recorded scripts. This data can reside in the "cloud" (i.e., not on either the remote vehicle or OCU, but available from a Command, Control, Communications, Computers, Intelligence, Surveillance and Reconnaissance (C4ISR) network, e.g., satellite), or may be kept in data storage locally as part of the operators' knowledge base. The data can also be "plugged in"—e.g., reside on a portable data storage unit pre-loaded with data useful on missions of that type.

In this sense, the present teachings contemplate data packages that can define executable programming structures that, in combination with the various computers, networks, sensors, actuators, and user interfaces, define and/or guide and/or assist an operator to conduct a mission in a manner that extends beyond the operator's native training and ability to pilot a remote vehicle in real time.

An exemplary type of data package is a combination of executable routines and end-user guidance that define a mission, perhaps in combination with necessary or recommended payloads or remote vehicle configurations. A TTP state machine can be defined in documentation, operator control unit routines, end user interface elements, and remote vehicle routines to substantially define a mission. The state machine can include a combination of free, guided (including notifications, highlights, and alarms), scripted, assisted, or autonomous steps, sometimes divided into mission phases, and may also define the facilities (hardware, configuration, and databases) that support it, as well as environmental constraints. Additionally, there are mission-specific physical tools (detonation cord that may detonate, heavy tools that may off-balance the remote vehicle, disrupters that have significant recoil, etc.) that may pose limitations on remote vehicle operation during the mission and filters on remote vehicle actuation may be provided to condition the remote vehicle's operation to avoid risks (operational and safety) associated with the presence such tools. Mission phases themselves may have initialization sequences.

Another type of data package can include families of predefined scripts for defining sequences of guided, assisted, and autonomous acts or steps. Such scripts would be formed up from primitives known to be useful in missions with the remote vehicle.

A third type of data package can include intelligence and shared resource information, for example pre-existing or prior missions recorded as telemetry streams and video/audio, pre-existing or prior maps recorded as graphics or photos, 3D sensed walls and other obstacles, topological connections of routes and waypoints, marker overlays, occupancy grids (e.g., occupancy maps such as point grids, area grids, or quad trees and/or free space maps in spatial graph or Voronoi diagram form), and notes of an operator (personal) or made by an external authority (training, intelligence, or command notes).

Initialization for initial configuration may occur at any of power up, cold payload swap, or hot payload swap. Initialization can be a two-step process. The first step can include a base configuration and can comprise power up, a cold payload swap, and a hot payload swap. Each independent component (i.e., each component having a network interface) upon power up discovers the remainder of the components on the network, for example via Zeroconf, mDNS, UPnP, SSDP or an equivalent network configuration protocol. The components can include, for example, a remote operator control unit (networked, for example, wirelessly), payloads, a remote vehicle chassis, and smart sensors. Payloads can be chassis payloads (connected within the chassis via a network plug), arm/neck payloads (connected and mounted to a network plug at an arm joint or distal end), and operator control unit payloads (connected to a network plug on a remote operator control unit). An exemplary operator control unit payload would include a military radio. The base network can include a wired network (e.g., switched Ethernet) among a chassis processor module, another processor module such as a smart "head," one or more motor control nodes, a node/payload network distributed about the chassis and arms, and a wireless network. In certain embodiments, one payload can be supervisory and receive and pass on instructions from the operator control unit. Where a payload includes or implies user interface elements, interactions, communications protocols, databases, or telemetry that are distinct or unique to the payload, or changes to defaults, these included or implied elements can be communicated to entities on the network via XML or another configuration file exchange (via polling, pushing, or other discovery and exchange modes).

The operator control unit can include a rule set for populating, servicing, and responding to new user interfaces and mission concept of operations (CONOPS) provided by a network entity plugged in at startup, cold swap, or hot swap. In some cases, the network entities will have an effect on the morphology, climbing/obstacle strategies and physics of movement, motor loads, etc. The payloads can report their power demands, center of gravity position, weight, and ranges for the same, and the supervisory payload can accommodate these in kinematic calculations and behavioral motion. In other cases, payloads can include replacement or supplementary sensing for existing facilities (e.g., a second IMU or incremental accelerometer/rate gyros, a second radio, a second GPS, a third camera), and will report their operating parameters. Payloads may also have replenishable material or ammunition, and may report the status of the same directly or indirectly (e.g., requiring operator count, sensing count directly, or sensing a low status by weight/acceleration response). This disclosure includes examples of notification modes via iconography, text, other symbols, and it is intended that all of the discussed information made available to the operator control unit (e.g., state of replenishable materials, network status, change in remote vehicle model, etc. can be displayed on the operator control unit using such iconography, text, other symbols, as desirable and in accordance with the designer's or operator's preferences.

Once a default network has been formed (among, for example, a robot head supervisor, a chassis, a manipulator payload, and an operator control unit), a new network entity can come online and provide its interfaces. Certain types of payloads and/or new network entities are suitable examples for explaining reconfiguration. A CBRNE (chemical-biological-radiological-nuclear-enhanced explosives) or HazMat detection payload or network of payloads, if placed on the remote vehicle, will need to provide telemetry, alarm conditions, and a status of plural sensors. Messaging for providing this data may be native to the payload or may be provided by an intervening "converter" payload for interpreting the data provided by the CBRNE payload and packaging it into protocols or APIs that can be used by the remote vehicle. In preparation for sharing video, CBRNE/Hazmat payload data, or map data with other remote vehicles, or for providing common user interface elements (e.g., icons, virtual meters and indicators, warning or notice text, alarm graphics) the payload may provide XML or other document or data type definitions to the remote vehicle, which may communicate these to other remote vehicles.

Figure 7A:
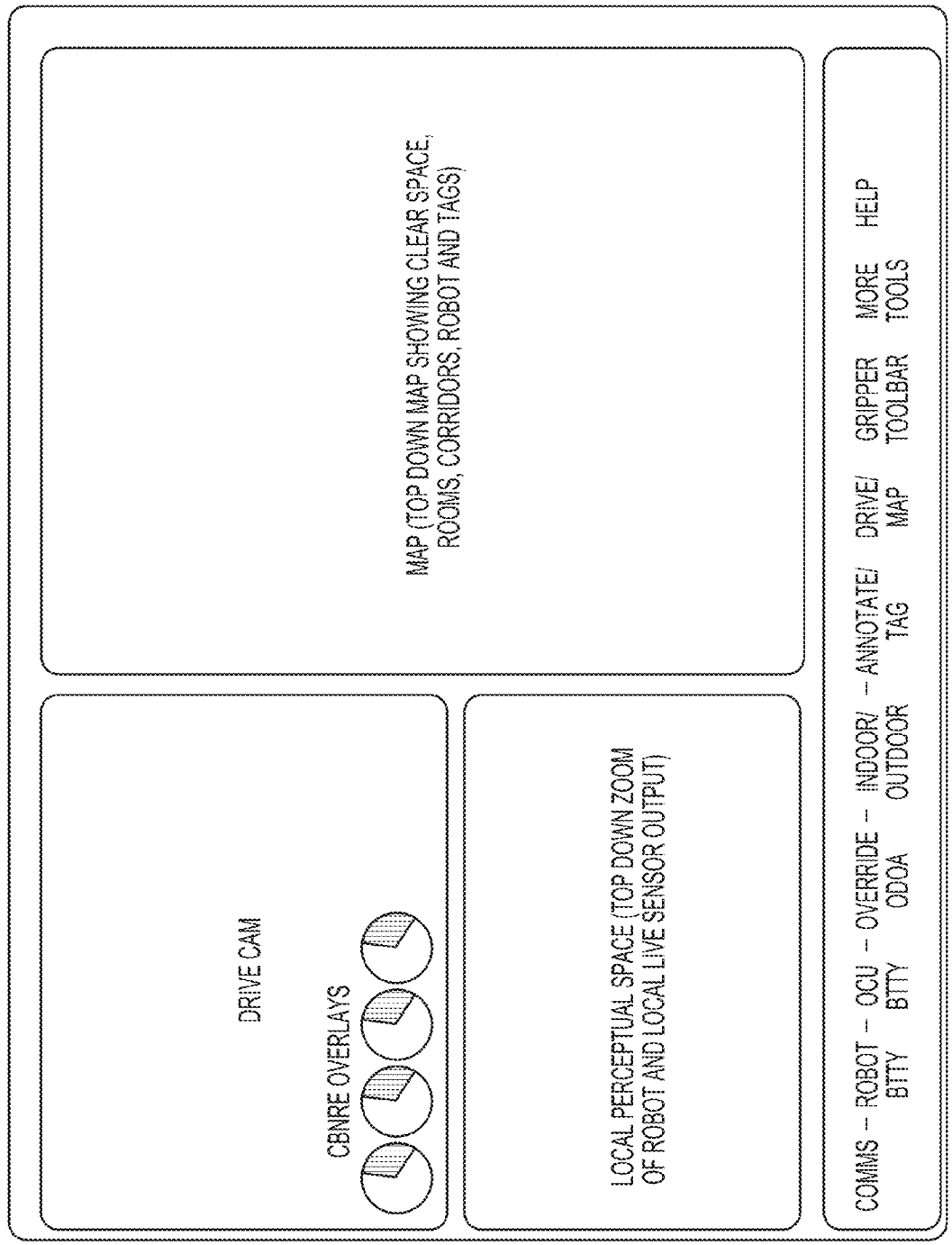
FIG. 7A provides an exemplary graphical user interface layout in accordance with the present teachings.

FIGS. 7-9 illustrate exemplary layouts of a graphical user interface for a remote vehicle having a CBRNE payload, the data from the CBRNE payload being displayed via the pie chart-type circular overlays in the upper left portion of the interface. In FIG. 7A, initialization has taken place and the interface displays a drive cam video feed in the upper left corner, a local perceptual space display including a top down zoom of the remote vehicle in its environment and local live sensor input, and a top down map showing clear space, rooms, corridors, a representation of the remote vehicle, and certain information tags added by, for example, the user or the remote vehicle. A tool bar at the bottom of the illustrated exemplary interface can include, for example, indicators for communication status, remote vehicle battery status, operator control unit battery status, as well as an icon allowing the operator to override a persistent object detection/object avoidance behavior, an icon allowing the operator to select either indoor or outdoor operation for the remote vehicle, an icon allowing the operator to annotate or tag the map displayed on the right side of the interface, an icon allowing the operator to select between driving the remote vehicle and supervising a mapping function, an icon allowing the operator to select the gripper toolbar described above, and an icon allowing the user to view additional available tools. The illustrated toolbar also includes a help icon, the functionality of which would be understood by those skilled in the art.

Figure 7B:
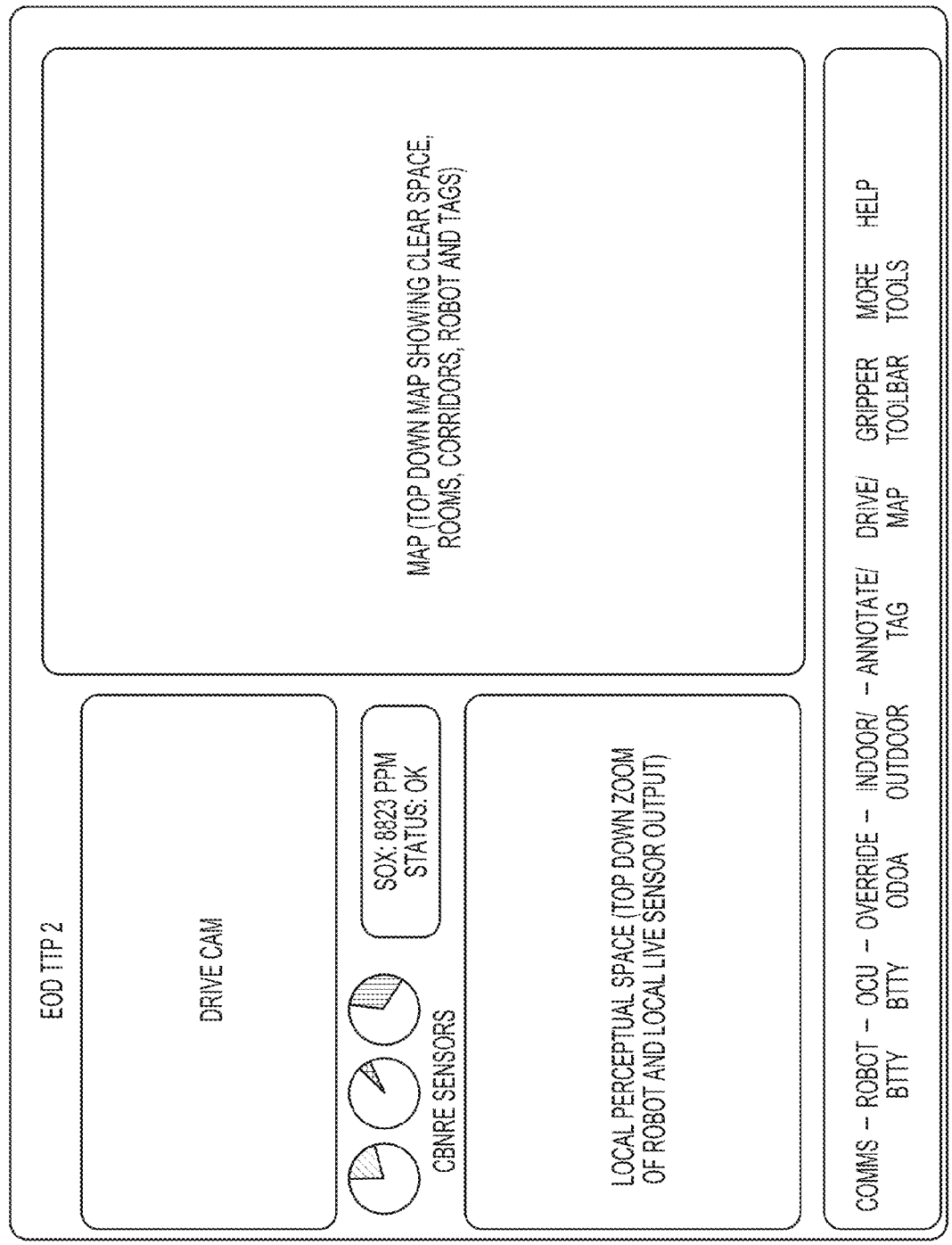
FIG. 7B provides an exemplary graphical user interface layout in accordance with the present teachings.

FIG. 7B illustrates another exemplary embodiment of a user interface layout, differing from FIG. 7A in that data from the CBRNE payload is displayed between the drive cam display and the local perceptual space display via three circular pie chart-type indicators and a text display (e.g., including a sensor status and a sulfur oxide level).

Figure 8A:
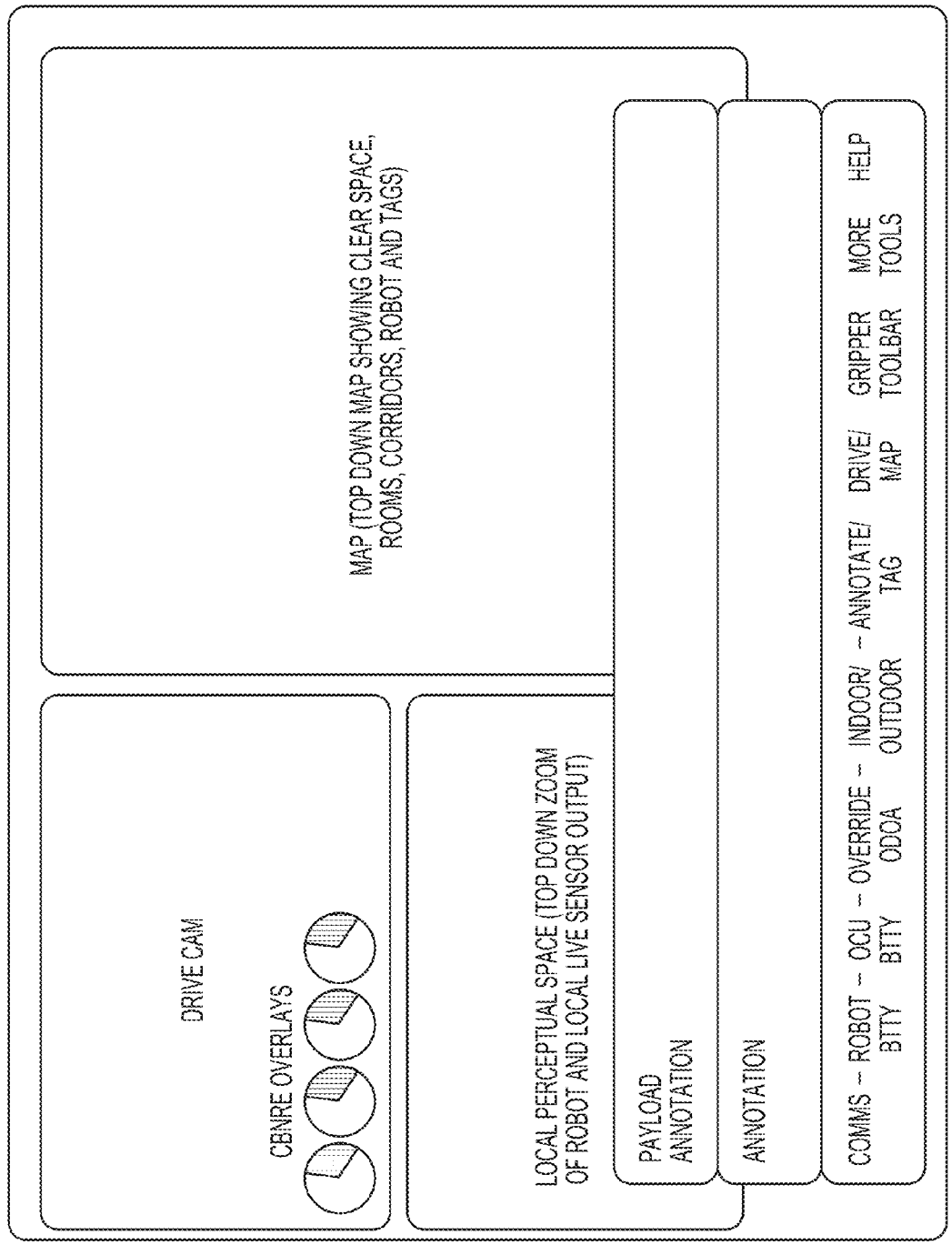
FIG. 8A provides an exemplary graphical user interface layout in accordance with the present teachings.

FIG. 8A is a layout of a user interface similar to FIG. 7A, including annotation and payload annotation toolbars. These toolbars can be, for example, persistent or pop-up type toolbars, and can include icons or selections that facilitate the operator's entry of annotations, some of which may be payload-specific. An example of payload-specific annotations includes annotations for a CBRNE payload, which can include markers for a variety of hazard types and levels.

Figure 8B:
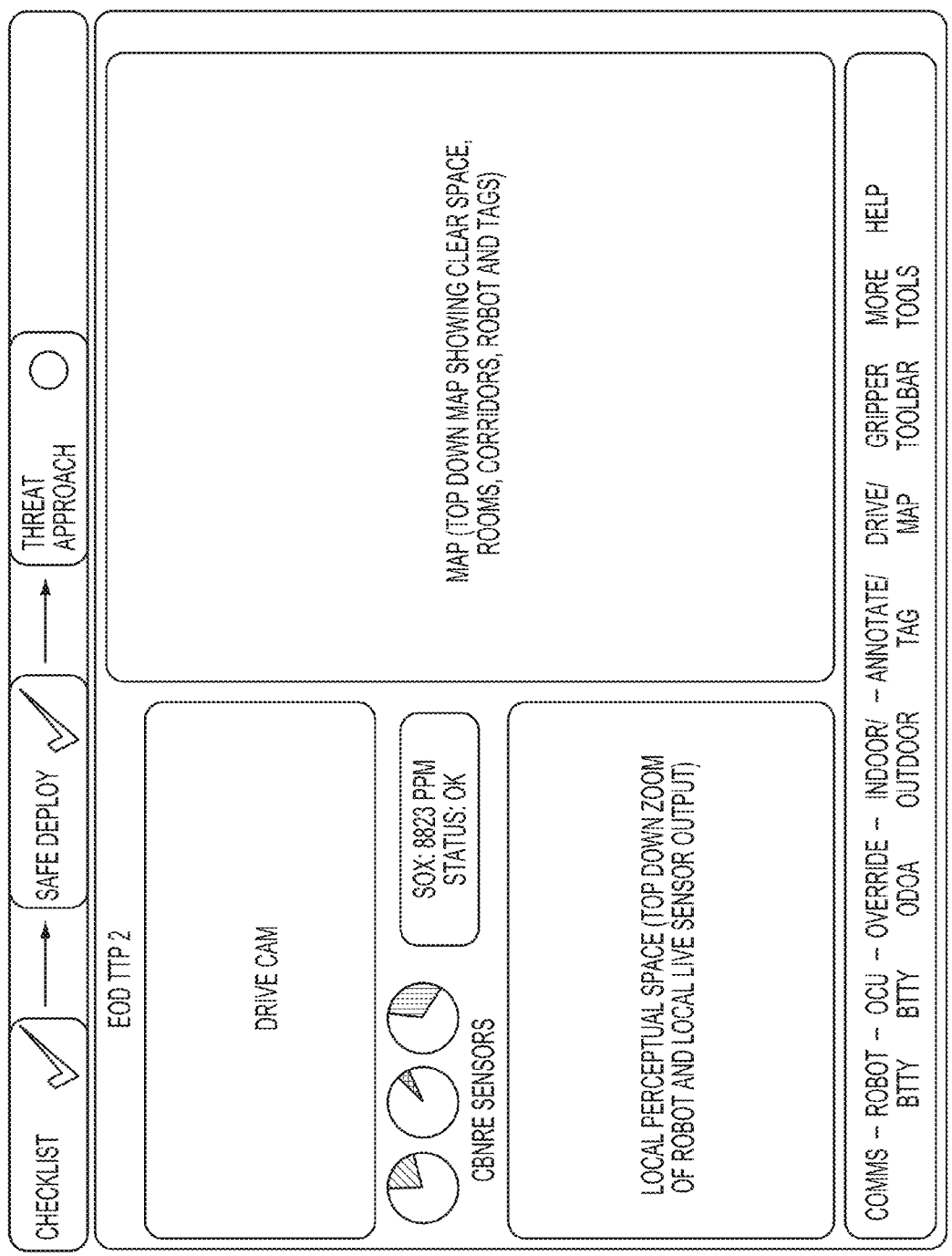
FIG. 8B provides an exemplary graphical user interface layout in accordance with the present teachings.

FIG. 8B is similar to FIG. 7B, but includes a menu at the top of the interface including a checklist button, a safe deploy button, and a threat approach button. The checklist button can be utilized, for example, to provide a procedural checklist for a soldier for a specific mission. The checklist button can provide mission steps or can allow the soldier to conduct the mission while complying with certain predetermined guidelines such as, for example, safety procedures or rules of engagement. The safe deploy button can be, for example, one of the checklist steps that was selected by the operator, and can itself provide the operator with mission steps or can allow the soldier to conduct the mission while complying with certain predetermined guidelines. The threat approach button can be, for example, one of the safe deploy steps that was selected by the operator. Pressing this button can cause the remote vehicle to approach a selected threat autonomously, or can cause the operator to select a target that the remote vehicle will then approach autonomously. Alternatively, the checklist button can include a checklist to be performed by the operator for a certain mission. After the operator completes the steps of the checklist, he or she can indicate completion. In certain embodiments, completion is represented by a check mark appearing in the button. The safe deploy button can comprise steps to be undertaken by the remote vehicle. After the remote vehicle completes the steps and notifies the operator control unit that the steps are completed, a check mark can appear in the button. Thereafter, the mission or routine, here to approach a selected threat, can begin. The mission or routing can be operator-driven, semi-autonomous, or autonomous.

Figure 9A:
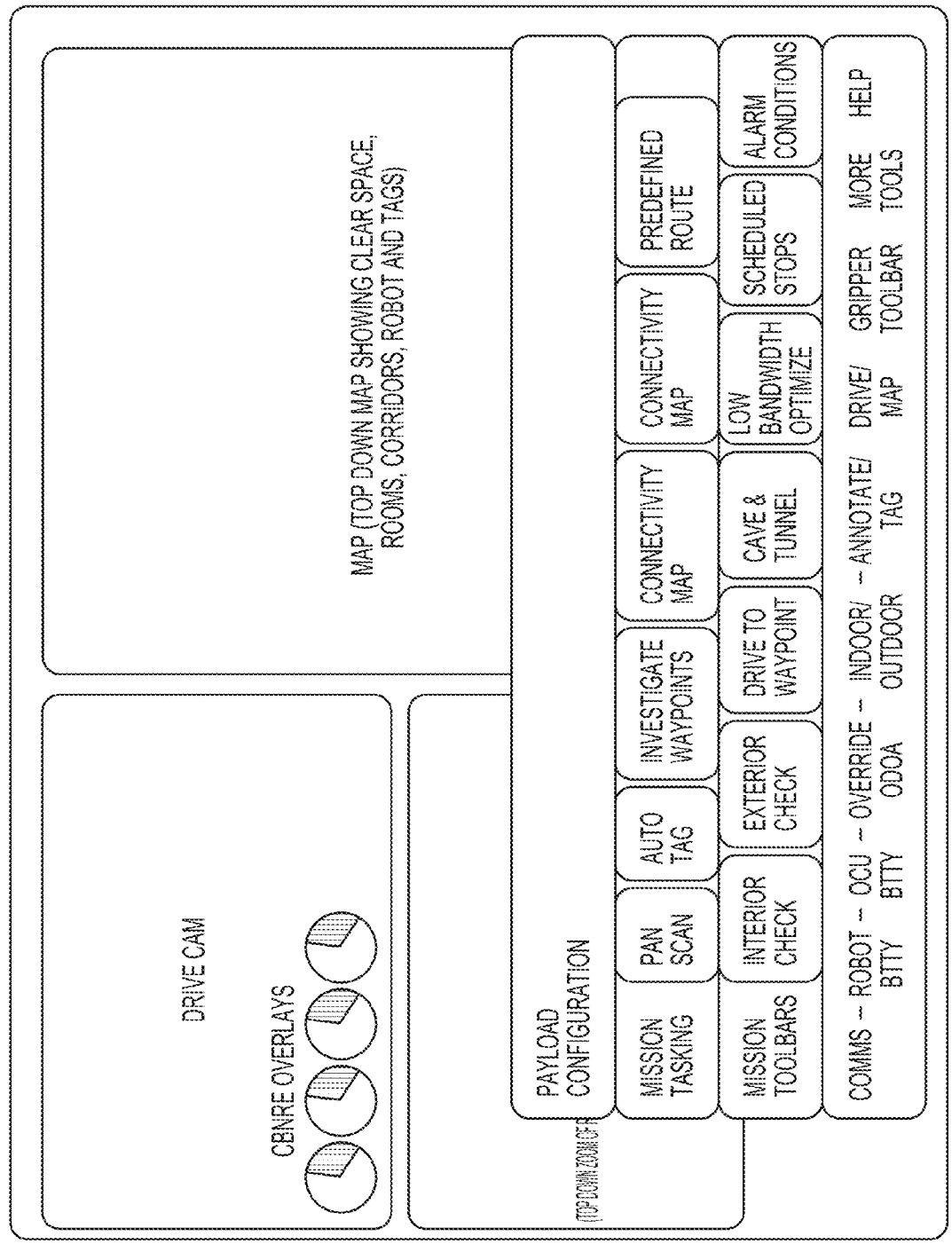
FIG. 9A provides an exemplary graphical user interface layout in accordance with the present teachings.

FIG. 9A is a layout of a user interface including a mission toolbar including exemplary missions such as an interior check mission, and exterior check mission, a drive-to-waypoint behavior, and a cave and tunnel exploration mission. A user can also optimize low bandwidth, input scheduled stops, and input alarm conditions by selecting icons on this mission toolbar. A mission tasking toolbar can also be provided, including such mission tasks or remote vehicle actions as: (1) pan/scan, which causes one of the remote vehicle's camera's to pan and scan the remote vehicle environment in a predetermined manner for a predetermined time or until turned off; (2) auto tag, which causes the remote vehicle to automatically tag a map being created, for example in area's where communication with the operator control unit is available; (3) investigate waypoints, causing the remote vehicle to investigate one or more previously0defined waypoints; (4) connectivity map, which can create a map indicating the strength or availability of connectivity through the remote vehicle's mission; (5) predefined route, which causes the remote vehicle to follow a predefined route, for example for perimeter surveillance. A payload configuration toolbar is also illustrated in the exemplary interface of FIG. 9. The payload configuration toolbar can be used, for example for a CBRNE payload, for controlling or configuring the payload, for example turning portions on or off, running in a low-power mode, resetting counters, etc., similar to how a printer can be configured via a driver when it is first connected with into a computer.

Figure 9B:
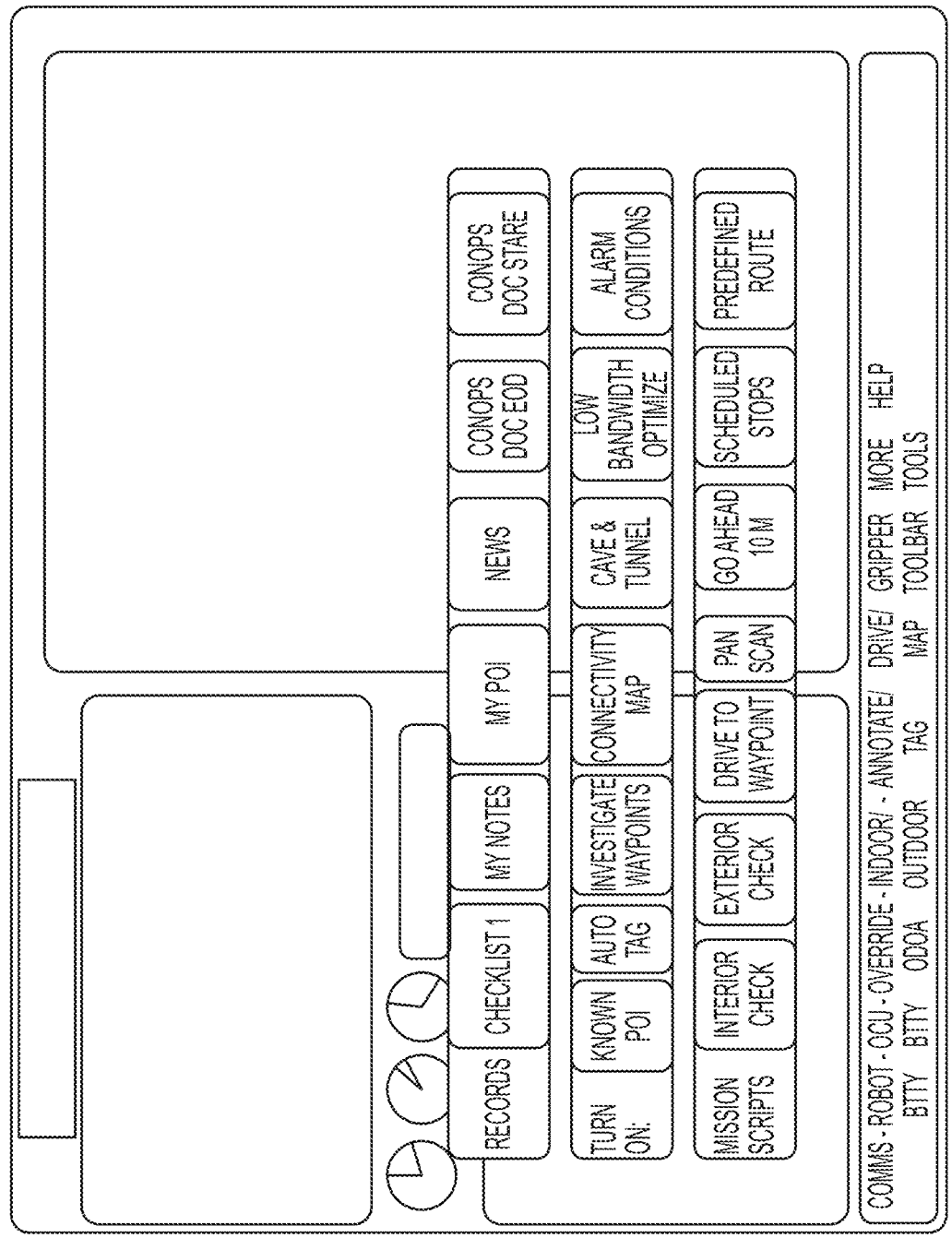
FIG. 9B provides an exemplary graphical user interface layout in accordance with the present teachings.

FIG. 9B illustrates a screen layout similar to that of FIGS. 7B and 8B, and including a RECORDS menu, a TURN ON menu, and a MISSION SCRIPTS menu. These menus can be, for example, persistent or pop-up type menus. The RECORDS menu can comprise, for example, buttons allowing the operator to view or edit one or more checklists, view or edit notes, view or edit a POI, view or edit news, and view or edit CONOPS documents for a variety of missions (e.g., an EOD mission and a persistent stare mission). The TURN ON menu can comprise, for example, icons representing missions, routines, devices, or conditions that can be turned on, for example a known POI routine, an auto tag routine, an investigate waypoints routine, a connectivity map routine, cave and tunnel exploration mission, a low bandwidth optimize routine, and alarm conditions. The MISSION SCRIPTS menu can include icons representing a variety of mission scripts, including a interior check script, and exterior check script, a drive-to-waypoint script, a pan/scan script, a go ahead 10 meters script, a scheduled stops script, and a predefined route script.

To facilitate the remote vehicle's performance of a mission such as the exemplary missions described above, the user can utilize a software package with mission support software (e.g., capabilities, applications, and a user interface) that work with predetermined payloads that have drivers in the acquired software package or already on your remote vehicle (e.g., the drivers came with the payload). In an exemplary implementation, upon startup, one or more available remote vehicles can provide a list of missions they can each support to the operator control unit. The missions that a remote vehicle supports can depend on, for example, the remote vehicle's hardware and software configuration (e.g., payloads, software-alone TTP support or sensor-dependent TTP support, etc.).

Figure 10:
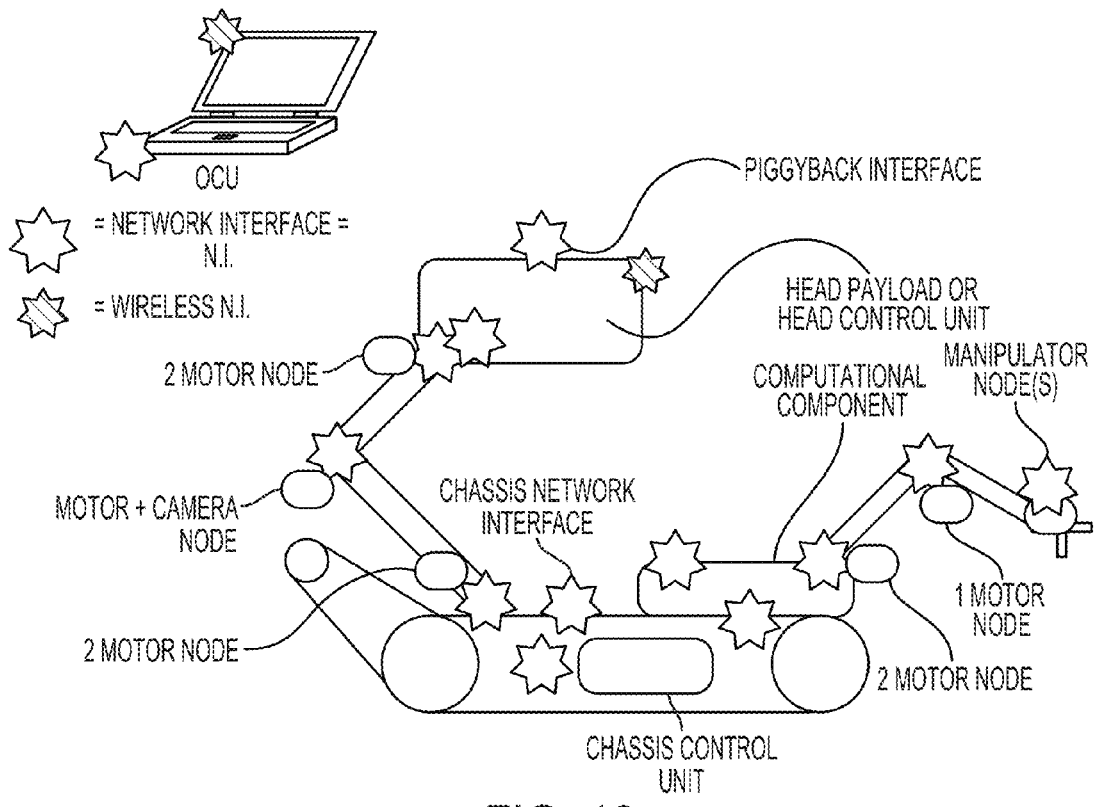
FIG. 10 is a schematic illustration of an exemplary embodiment of a remote vehicle's basic network elements in accordance with the present teachings.

FIG. 10 is a schematic illustration of an exemplary embodiment of a remote vehicle's basic network elements, including the basic remote vehicle network capability before the system is customized for a TTP mission. In the illustrated embodiment, an operator control unit networked with other computers and is wirelessly networked with a remote vehicle, for example via wireless connectivity with the remote vehicle's head payload or head control unit. A piggy back interface can be use to connect a piggybacked payload to the remote vehicle head network including nodes for the head, at least one motor in each joint of the arm on which the head is mounted, any cameras provided on the head. A chassis network interface can be provided to connect a payload mounted to the chassis with the chassis network (including a node for the chassis control unit), the chassis network being connected with the head network and a manipulator network. The manipulator network can include one or more nodes for a computational component, and nodes for at least one motor in each joint of the manipulator arm and a gripper motor.

Figure 11:
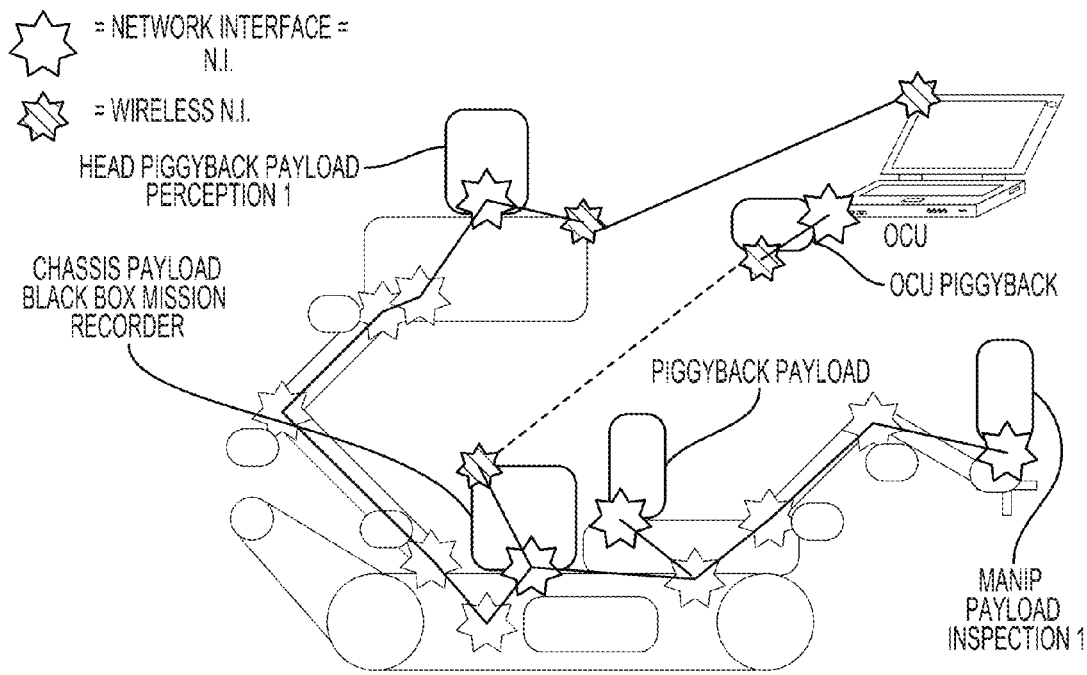
FIG. 11 is a schematic diagram of an exemplary embodiment of a remote vehicle network having certain Tactics, Techniques, and Procedures (TTP)-related payloads.

FIG. 11 is a schematic diagram of an exemplary embodiment of a remote vehicle network having certain TTP-related payloads, showing exemplary TTP-related payloads mounted to the network, particularly payloads that can facilitate the above-listed missions (e.g., a CBRNE detector, improved 3D sensing, mission recording, and improved vision on the manipulator). As shown, a piggyback payload, such as a laser scanner, can be provided on the remote vehicle head to provide improved 3D sensing, as shown in FIG. 11 and described in U.S. patent application Ser. No. 12/916,482, filed Oct. 29, 2010, titled Remote Vehicle Control System and Method. The piggybacked payload can be interfaced with the remote vehicle head network and thus with a combine head-chassis-manipulator network. A black box mission recorder can be mounted to the remote vehicle chassis to perform mission recording, and can be interfaced with the chassis network and thus with a combine head-chassis-manipulator network. A CBRNE sensor can be mounted to the computational component and used for CBRNE sensing, and can be interfaced with the manipulator arm network and thus with a combined head-chassis-manipulator network. An improved camera (e.g., a zoom camera) can be provided on the manipulator arm payload, for example at a distal end of the manipulator arm payload, to provide improved vision on the manipulator arm. The improved camera can be interfaced with the manipulator arm network and thus with a combined head-chassis-manipulator network. In the illustrated embodiment, the black box mission recorder can be wirelessly connected to the operator control unit to transmit mission data directly to the operator control unit, for example via a networked payload attached to the operator control unit.

Figure 12:
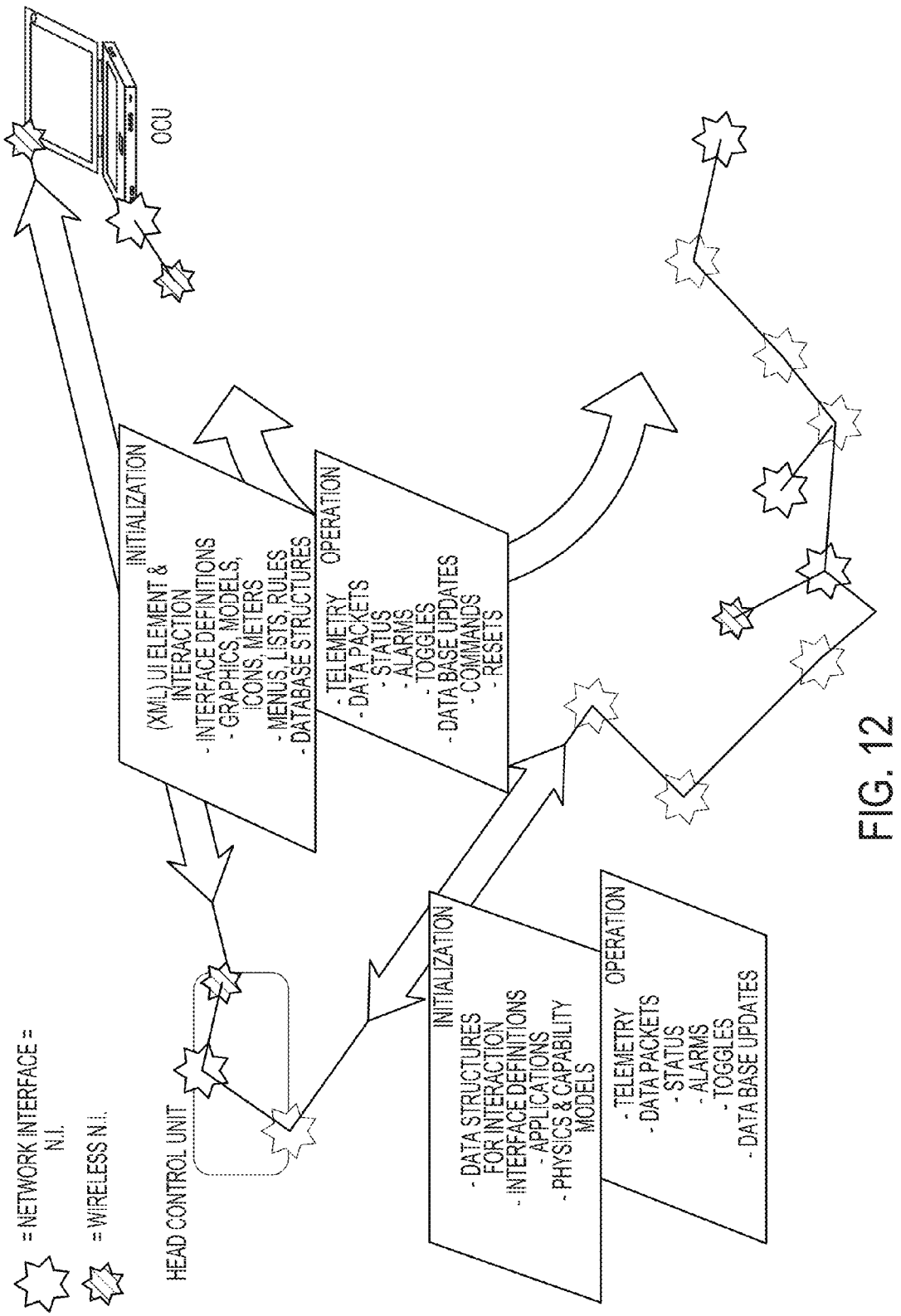
FIG. 12 is a schematic diagram of the network of FIG. 11, showing only the smart parts of the remote vehicle that are networked.

FIG. 12 is a schematic diagram of the network of FIG. 11, showing only the smart parts of the remote vehicle that are networked (e.g., the remote vehicle head and the operator control unit) and describes traffic on the network that would facilitate one or more of the above-listed missions. As shown, during initialization, the following data passes between the chassis and the remote vehicle head: (1) data structures for interaction; (2) interface definitions; (3) applications; and (4) physics and capability models. During operation of the remote vehicle, the following data passes between the chassis and the remote vehicle head: (1) telemetry data; (2) data packets; (3) status information; (4) alarms; (5) toggles; and (6) database updates. During initialization of the remote vehicle, the following data passes between the remote vehicle head and the operator control unit: (1) interface definitions; (2) graphics, models, icons, and meters; (3) menus, lists, and rules; and (4) database structures. During operation of the remote vehicle, the following data passes between the remote vehicle head and the operator control unit: (1) telemetry data; (2) data packets; (3) status information; (4) alarms; (5) toggles; (6) database updates; (7) commands; and (8) resets.

Figure 13:
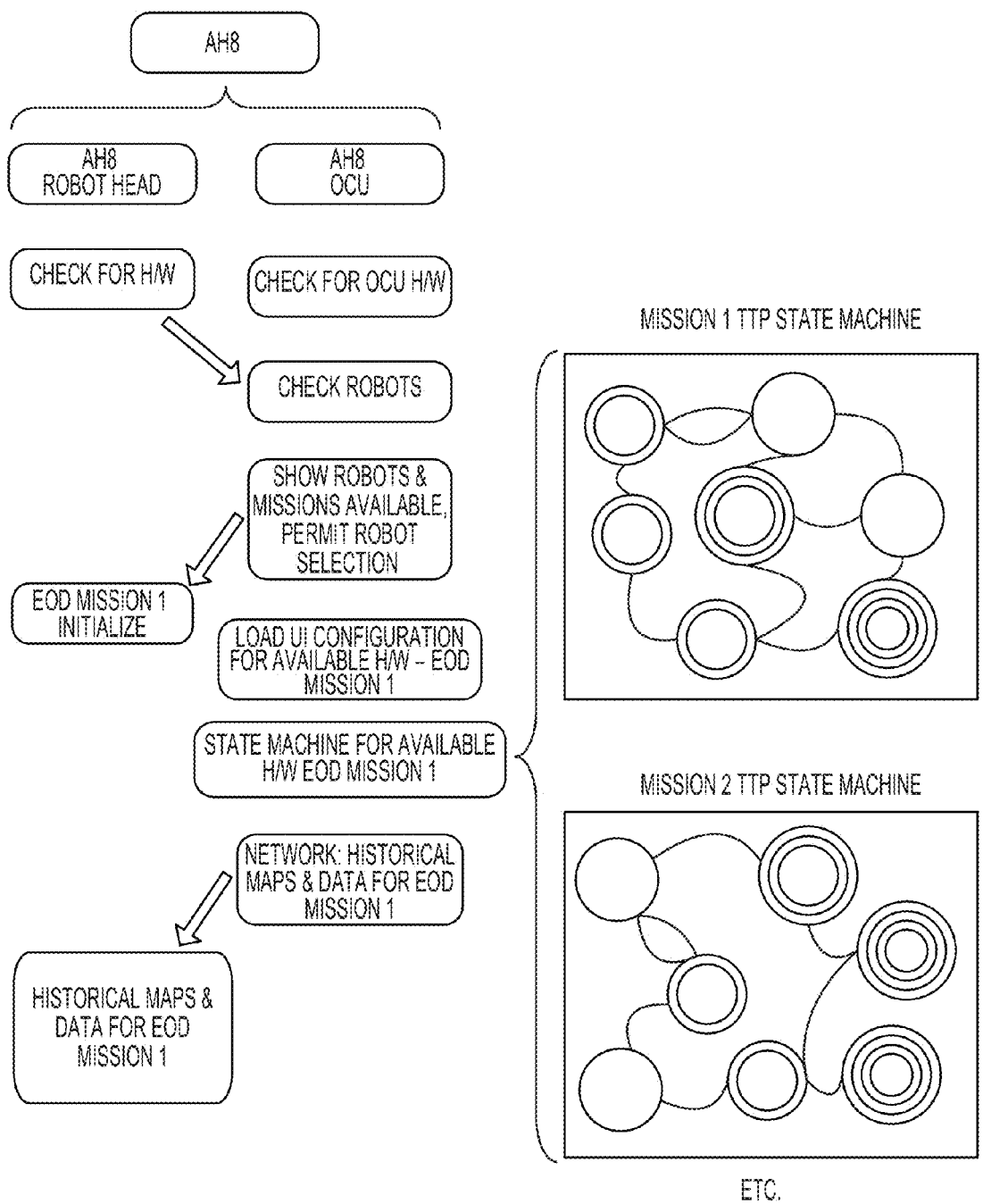
FIG. 13 is a flowchart illustrating TTP detail.

FIG. 13 is a flowchart illustrating TTP detail and showing that, to support a mission, information would be loaded and the operator control unit and the remote vehicle would each load some of the data. As shown, the exemplary system includes at least a robot head and an operator control unit. The operator control unit checks for hardware and checks for remote vehicles with which it can communicate to send/receive data and commands for the mission. The robot head checks for hardware on the remote vehicle to which it is attached and also checks for other remote vehicles with which it can communicate and share data. Information regarding the other remote vehicles can be retrieved from the operator control unit. From this collected information, the system can determine which missions each available remote vehicle can perform, informs the operator (e.g., via the operator control unit) regarding available remote vehicles and supported missions, and allows the operator to select a remote vehicle and a mission. In the illustrated embodiment, the operator selects an EOD mission, for example via interaction with the operator control unit. The operator control unit then loads a user interface configuration based on the available OCU and remote vehicle hardware, and the selected EOD mission. As shown, a state machine is available for the selected EOD mission. The operator control unit then retrieves any available historical maps and data available for and relevant to the selected EOD mission, and sends the historical data to the robot head for use in the mission.

Figure 14:
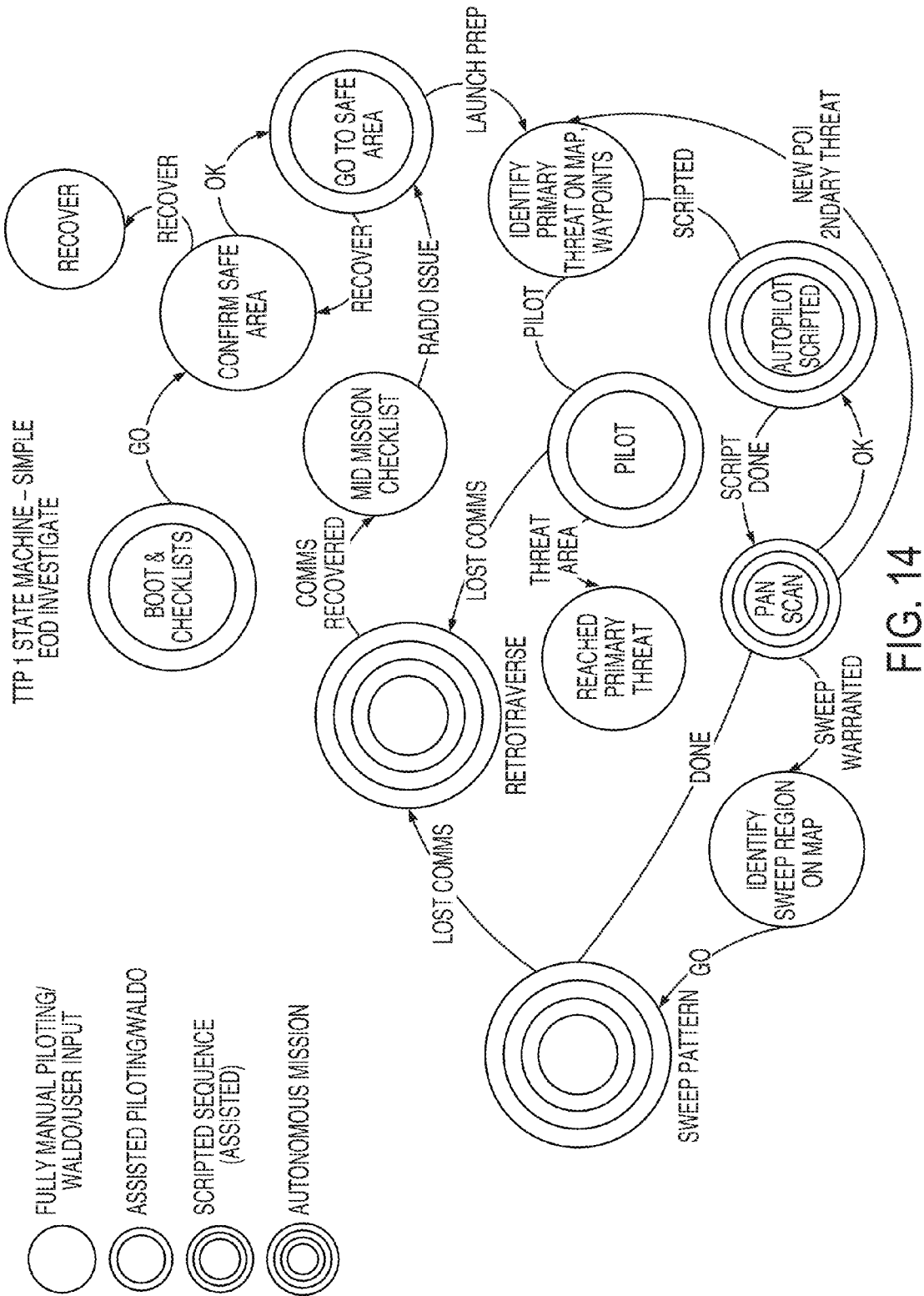
FIG. 14 illustrates an exemplary (many-state, deterministic) state machine for an explosive ordnance disposal (EOD) investigation.

FIG. 14 illustrates an exemplary (many-state, deterministic) state machine for an EOD investigation, and provides an example of the kinds of bits that would be part of the recommended TTP for a mission. Recommended bits can vary from fully manual piloting (e.g., following a procedure commanded via the operator control unit) to assisted piloting, to scripted sequences assisting the operator, to fully autonomous remote vehicle behaviors (e.g., a sweep behavior or a retro-traverse behavior). The recommended TTP for a mission is structured as instructions causing the remote vehicle or the operator to follow a precise series of actions, e.g.: Always do this, and this, then this. During manual operation, the remote vehicle can inform the operator regarding each step and coach the operator so that the operator can maintain better situational awareness or perform other tasks.

Figure 15:
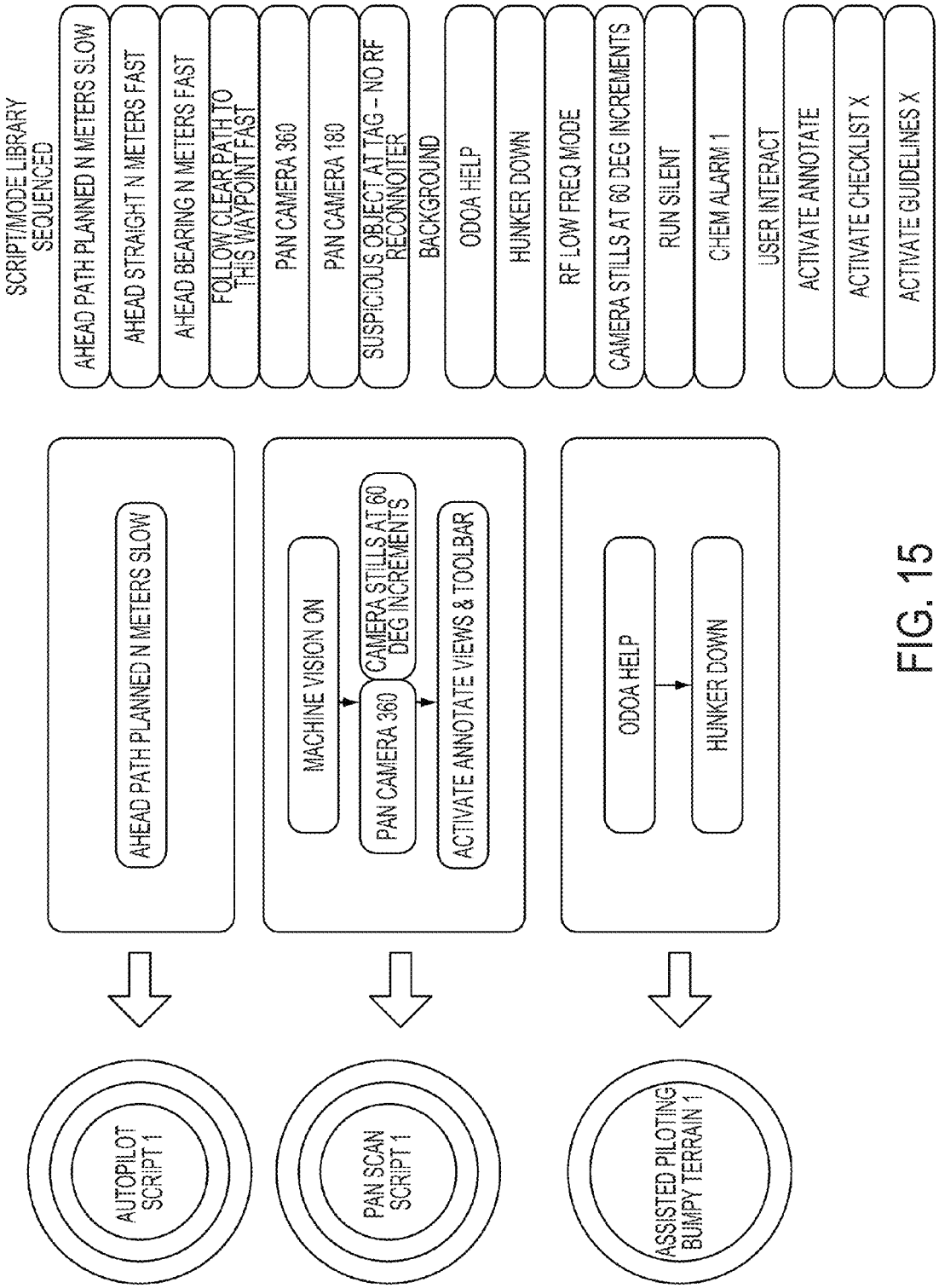
FIG. 15 illustrates an exemplary set of scripts that can be utilized to support an EOD inspection mission.
Figure 16:
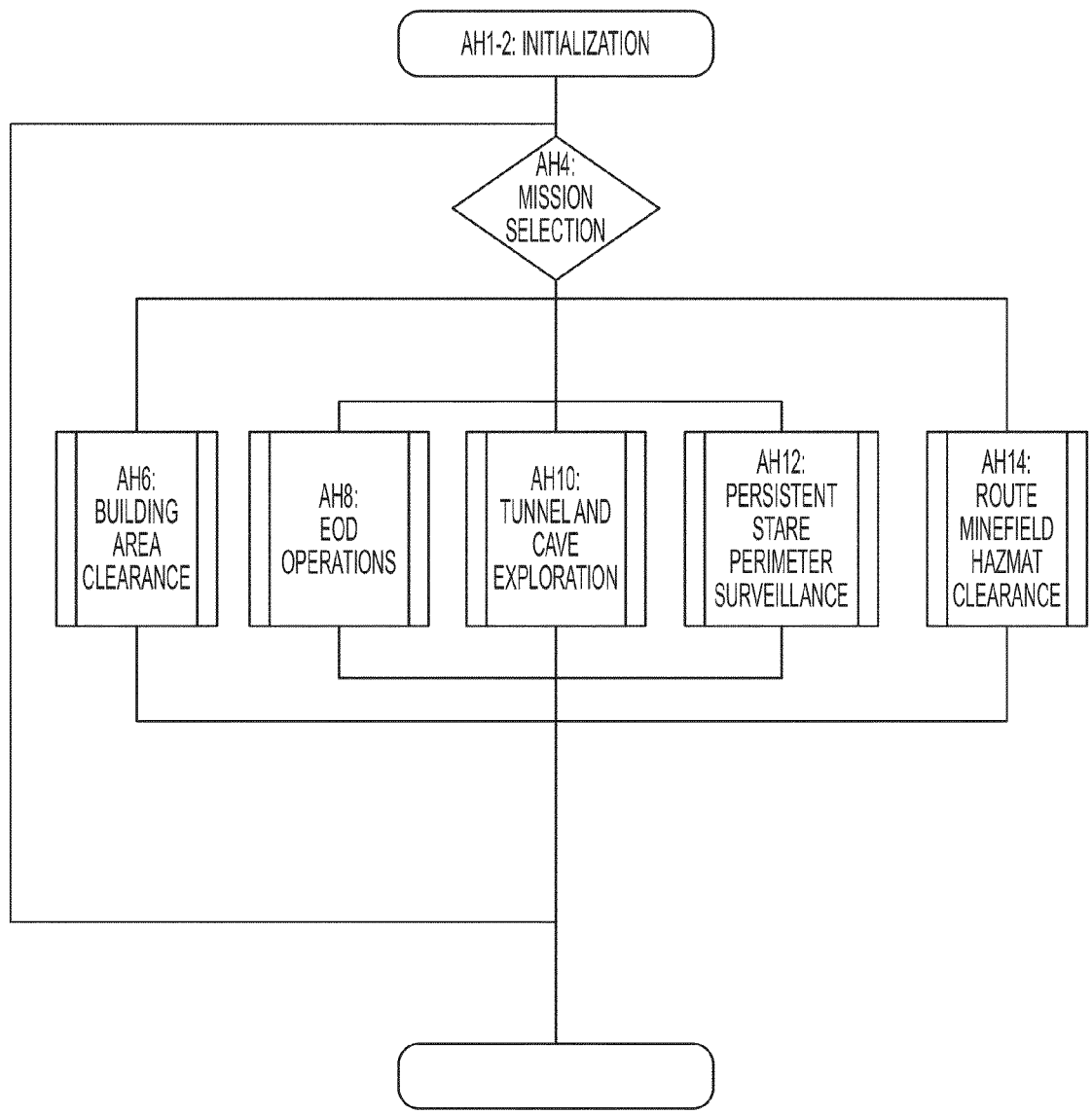
FIG. 16 illustrates an exemplary mission selection process.

FIG. 15 illustrates an exemplary set of scripts that can be utilized to support an EOD inspection mission. It shows how many script primitives and what type of script primitives could be used to define an autonomous script (e.g., an autopilot script, a pan/scan script, and an assisted piloting script for bumpy terrain). One skilled in the art will understand that the following list is exemplary only, and is not intended to provide an exhaustive list of scripts typically or desirably available for mission support. As shown, the available scripts can include:

SCRIPT/MODE LIBRARY SEQUENCED
    AHEAD PATH PLANNED N METERS SLOW
    AHEAD STRAIGHT N METERS FAST
    AHEAD BEARING N METERS FAST
    FOLLOW CLEAR PATH TO THIS WAYPOINT FAST
    PAN CAMERA 360
    PAN CAMERA 180
    SUSPICIOUS OBJECT AT TAG—NO RF RECONNOITER
    BACKGROUND
    ODOA HELP
    HUNKER DOWN
    RF LOW FREQ MODE
    CAMERA STILLS AT 60 DEG INCREMENTS
    RUN SILENT
    CHEM ALARM 1
    USER INTERACT
    ACTIVATE ANNOTATE
    ACTIVATE CHECKLIST X
    ACTIVATE GUIDELINES X

Any predefined scripts using remote vehicle mission primitives may be used outside of the context of a TTP state machine or guidelines. However, for the purposes of this description, some exemplary scripts will be discussed.

Generically, predefined scripts may be made up of different classes of scriptable end user or remote vehicle operations, some of which are linear, in-order events, some of which are conditions to be satisfied or background remote vehicle/sensor operations turned on during the script.

As shown in FIG. 15, which depicts merely examples of script primitive types, script primitives, and assembled scripts, several types of script primitives may be sequenced with one another, conditioned upon one another, or run in the background or foreground of the remote vehicle, OCU, or payload capable of receiving commands.

As shown, an AUTOPILOT script can utilize, for example, an AHEAD PATH PLANNED N METERS SLOW script. A PAN SCAN script can utilize a MACHINE VISION ON script, a PAN CAMERA 360 script, a CAMERA STILLS AT 60 DEG INCREMENTS script, and an ACTIVATE ANNOTATE VIEWS AND TOOLBAR script. An ASSISTED PILOTING BUMPY TERRAIN script can utilize and ODOA HELP script and a HUNKER DOWN script. These three behaviors can be used to autonomously drive the remote vehicle to within a predetermined distance of a suspected EOD, investigate the EOD, and record data regarding the EOD and its environment. Thus, a library scripts is available and can be used alone or in combination to perform acts (e.g., autopilot, pan and scan, and assisted piloting) that support a selected mission.

During an EOD mission, to allow the remote vehicle to autonomously approach an object, the actions would have to be programmed within in the system, and are preferably interruptible by the operator and easy to understand. Scripting provides a simple and efficient format for such programming, even for providing a closed-cycle and complex mission.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. An operator control unit comprising:
   a transmission unit configured to transmit data to a remote vehicle;
   a receiver unit configured to receive data from the remote vehicle, the data received from the remote vehicle comprising image data captured by the remote vehicle; and
   a display unit configured to display a user interface comprising the image data received from the remote vehicle and icons representing a plurality of controllable elements of the remote vehicle, and configured to receive an input for a control command to control at least one of the plurality of controllable elements, the plurality of controllable elements comprising:
      one or more motor control nodes of an articulated manipulator arm having multiple coupled portions, each motor control node causing movement of one coupled portion relative to another coupled portion;
   wherein receiving a control command to control the at least one controllable element comprises:
      receiving a selection of an icon representing at least one controllable element;
      receiving a move command comprising a movement of the icon from a first position to a second position on the display unit, the icon constrained to move only in directions of possible movement of the corresponding at least one controllable element, movement of the selected icon causing movement on the display unit of any other icons representing any controllable elements movably coupled to the at least one controllable element of the selected icon, the movement of the any other icons corresponding to a change in pose of the remote vehicle resulting from the move command; and
      when the selected icon represents a motor control node of the manipulation arm and when the move command comprises a corresponding linear movement of the selected icon, the corresponding linear movement causing movement of other icons representing other motor control nodes of the manipulation arm with respect to the selected icon.

2. The operator control unit of claim 1, wherein the display unit comprises a touch-screen display and the icons each comprise an image of the controllable element that they represent,
   selecting the at least one controllable element comprises touching the touch-screen display at or around the icon representing the at least one controllable element, and
   inputting the action comprises manipulating the image of the at least one controllable element on the touch-screen while touching the screen.

3. The operator control unit of claim 1, further comprising a computer mouse,
   wherein selecting the at least one controllable element comprises clicking the mouse pointer at or around the icon representing the at least one controllable element, and
   inputting the action comprises manipulating the image of the at least one controllable element on the display while clicking the mouse.

4. The operator control unit of claim 1, further comprising a computer joystick,
   wherein selecting the at least one controllable element comprises clicking the joystick at or around the icon representing the at least one controllable element, and
   inputting the action comprises manipulating the image of the at least one controllable element on the display while clicking the joystick.

5. The operator control unit of claim 2, further comprising at least one stereo-vision camera to generate a 3D VOXEL-based representation of an area in which the vehicle is located,
   wherein data received from the vehicle further comprises stereo-vision-based data for generating the VOXEL-based representation,
   wherein the image displayed by the display unit further comprises the VOXEL-based representation and a representation of the remote vehicle, and
   wherein the VOXEL-based representation and the representation of the remote vehicle depict the inputted action.

6. The operator control unit of claim 5, wherein the user interface image further comprises an action-selection button, and pressing the action-selection button directs the operator control unit to request the remote vehicle to perform the inputted action depicted by the VOXEL-based representation and the representation of the vehicle.

7. The operator control unit of claim 5, wherein the operator control unit requests the vehicle to perform the action simultaneously to the depiction by the VOXEL-based representation and the representation of the vehicle.

8. The operator control unit of claim 6, wherein, after the vehicle performs the action depicted by the VOXEL-based representation and the representation of the vehicle, manipulation of any controllable element of the plurality of controllable elements updates the manipulation in at least one of the vehicle and the depiction by the VOXEL-based representation and the representation of the vehicle.

* * * * *